US012786992B2

(12) United States Patent
Maamari et al.

(10) Patent No.: US 12,786,992 B2
(45) Date of Patent: Nov. 3, 2026

(54) FULL-DUPLEX CONSIDERATIONS FOR CONFIGURED GRANT TRANSMISSION OCCASIONS

(71) Applicant: QUALCOMM Incorporated, San Diego, CA (US)

(72) Inventors: Diana Maamari, San Diego, CA (US); Huilin Xu, Temecula, CA (US); Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/409,285

(22) Filed: Jan. 10, 2024

(65) Prior Publication Data

US 2025/0227690 A1 Jul. 10, 2025

(51) Int. Cl.
*H04W 72/1268* (2023.01)
*H04L 5/14* (2006.01)
(Continued)

(52) U.S. Cl.
CPC ........... *H04W 72/1268* (2013.01); *H04L 5/14* (2013.01); *H04W 72/21* (2023.01); *H04W 72/566* (2023.01)

(58) Field of Classification Search
None
See application file for complete search history.

(56) References Cited

U.S. PATENT DOCUMENTS

2022/0311472 A1* 9/2022 Ly ........................ H04B 1/7143
2023/0156798 A1* 5/2023 Wang .................. H04W 74/006 370/329
2025/0055642 A1* 2/2025 Yang ..................... H04L 5/0053

FOREIGN PATENT DOCUMENTS

WO WO-2023015058 A1 2/2023
WO WO-2025007328 1/2025

OTHER PUBLICATIONS

R1-2306086, Incheon, Korea, May 22-26, 2023 (Year: 2023).*
(Continued)

*Primary Examiner* — Luna Weissberger
(74) *Attorney, Agent, or Firm* — Holland & Hart LLP

(57) ABSTRACT

Methods, systems, and devices for wireless communication are described. A user equipment (UE) may receive a control message indicating full-duplex (FD)-related resources allocated for one or more uplink shared channel messages and that correspond to a set of multiple uplink transmission occasions within a time period of a configured grant (CG) configuration. The UE may transmit, using at least one of the uplink transmission occasions in accordance with the CG configuration, an uplink control information (UCI) message including an indication of a quantity of unused uplink transmission occasions. The indication may exclude one or more invalid uplink transmission occasions based on a collision of one or more downlink messages or monitoring occasions with the one or more uplink shared channel messages. The UE may transmit one or more acknowledgment (ACK) or negative acknowledgment (NACK) messages in accordance with an identifier that excludes the invalid uplink transmission occasion(s).

28 Claims, 15 Drawing Sheets

(51) Int. Cl.
*H04W 72/21* (2023.01)
*H04W 72/566* (2023.01)

(56) References Cited

OTHER PUBLICATIONS

International Search Report and Written Opinion—PCT/US2025/010483—ISA/EPO—Apr. 16, 2025.
Moderator (Ericsson): "Moderator Summary#4 (Final)—XR Specific Enhancements", 3GPP TSG-RAN WG1 Meeting #113, R1-2306089, Incheon, Korea, May 22-26, 2023, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, May 26, 2023, 100 Pages, XP052495261, p. 1, line 9, para 1, p. 9, para 6.1.2.3, p. 42, para 4 p. 42, lines 12-16, para 4.1, table row 3, p. 56, lines 18-20 last 3 lines, p. 83 p. 59, lines 11-13.

* cited by examiner

FULL-DUPLEX CONSIDERATIONS FOR CONFIGURED GRANT TRANSMISSION OCCASIONS

FIELD OF TECHNOLOGY

The following relates to wireless communication, including full-duplex (FD) considerations for configured grant (CG) transmission occasions (TOs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support full-duplex (FD) considerations for configured grant (CG) transmission occasions (TOs). One or more invalid uplink transmission occasions (UTOs) may be defined for FD communications, including sub-band full-duplex (SBFD). For example, a user equipment (UE) may consider UTOs, including CG physical uplink shared channel (PUSCH) TOs, that at least partially overlap with one or more downlink messages as invalid. Based on identifying the invalid UTOs, the UE may transmit a UTO uplink control information (UTO-UCI) indicating one or more unused (e.g., skipped, reserved) UTOs and excluding the invalid UTOs. For example, the UE may avoid using one or more bits of the UTO-UCI that would otherwise be used to indicate the invalid UTOs, which may reduce a size of the message and improve system efficiency. The UE may also exclude invalid UTOs in determining a feedback identification (ID), such as for hybrid automatic repeat request (HARQ) ID calculation, which may increase efficiency for HARQ ID management. UTOs may, in some cases, be considered invalid due to collision with physical downlink control channel (PDCCH) monitoring occasions, with search space sets (SSSs), or with tracking reference signals (TRSs), and may further be based on conflicting message priorities, periodicities, or a time offset threshold.

A method for wireless communication by a UE is described. The method may include receive a control message indicating a set of multiple resources allocated for one or more uplink shared channel messages, the set of multiple resources corresponding to a set of multiple UTOs within a time period of a CG configuration, where the set of multiple resources include one or more full-duplex resources and transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

A UE for wireless communication is described. The UE may include one or more memories storing processor executable code (e.g., instructions), and one or more processors coupled with the one or more memories. The one or more processors may individually or collectively operable to execute the code (e.g., instructions) to cause the UE to receive a control message indicating a set of multiple resources allocated for one or more uplink shared channel messages, the set of multiple resources corresponding to a set of multiple UTOs within a time period of a CG configuration, where the set of multiple resources include one or more FD resources and transmit, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Another UE for wireless communication is described. The UE may include means for receive a control message indicating a set of multiple resources allocated for one or more uplink shared channel messages, the set of multiple resources corresponding to a set of multiple UTOs within a time period of a CG configuration, where the set of multiple resources include one or more FD resources and means for transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

A non-transitory computer-readable medium storing code for wireless communication is described. The code may include instructions executable by one or more processors to receive a control message indicating a set of multiple resources allocated for one or more uplink shared channel messages, the set of multiple resources corresponding to a set of multiple UTOs within a time period of a CG configuration, where the set of multiple resources include one or more FD resources and transmit, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Some examples of the method, UEs, and non-transitory computer-readable medium described herein may further include operations, features, means, or instructions for transmitting one or more acknowledgment or negative acknowledgment messages in accordance with an identifier, the identifier based on a first uplink shared channel occasion corresponding to a first UTO of the set of multiple UTOs, where the identifier may be further based on the quantity of unused UTOs excluded from the indication.

Some examples of the method, UEs, and non-transitory computer-readable medium described herein may further include operations, features, means, or instructions for transmitting one or more second uplink shared channel messages during one or more valid UTOs of the set of multiple UTOs in accordance with the CG configuration and receiving the one or more downlink messages during the one or more invalid UTOs.

In some examples of the method, UEs, and non-transitory computer-readable medium described herein, the UCI message may be multiplexed with each of the one or more second uplink shared channel messages that may be transmitted during the one or more valid UTOs.

Some examples of the method, UEs, and non-transitory computer-readable medium described herein may further include operations, features, means, or instructions for receiving a semi-static indication of a priority for each of the one or more downlink messages and for each of the one or more uplink shared channel messages, where the one or more invalid UTOs may be excluded based on an uplink shared channel message of the one or more uplink shared channel messages having a first priority and a downlink message of the one or more downlink messages having a second priority higher than the first priority.

Some examples of the method, UEs, and non-transitory computer-readable medium described herein may further include operations, features, means, or instructions for receiving a dynamic indication of a priority for each of the one or more downlink messages and for each of the one or more uplink shared channel messages, where the one or more invalid UTOs may be excluded based on a duration satisfying a threshold duration, the duration being between an end of receiving the dynamic indication and a start time for transmitting the UCI message.

In some examples of the method, UEs, and non-transitory computer-readable medium described herein, the one or more invalid UTOs may be excluded based on a collision between an uplink shared channel message of the one or more uplink shared channel messages and one or more downlink control channel monitoring occasions associated with the one or more FD resources.

In some examples of the method, UEs, and non-transitory computer-readable medium described herein, the one or more invalid UTOs may be excluded based on a collision between an uplink shared channel message of the one or more uplink shared channel messages and one or more SSSs associated with the one or more FD resources.

In some examples of the method, UEs and non-transitory computer-readable medium described herein, the one or more invalid UTOs may be excluded based on a collision between an uplink shared channel message of the one or more uplink shared channel messages and one or more TRSs associated with the one or more FD resources.

In some examples of the method, UEs, and non-transitory computer-readable medium described herein, the one or more invalid UTOs may be excluded based on a first periodicity associated with the one or more uplink shared channel messages and a second periodicity associated with the one or more downlink messages.

In some examples of the method, UEs, and non-transitory computer-readable medium described herein, the UCI message includes a bitmap including one or more first bits indicating a first subset of the set of multiple UTOs including the quantity of unused UTOs and one or more second bits indicating a second subset of the set of multiple UTOs including a quantity of used UTOs.

A method for wireless communication by a network entity is described. The method may include outputting a control message indicating a set of multiple resources allocated for one or more uplink shared channel messages, the set of multiple resources corresponding to a set of multiple UTOs within a time period of a CG configuration, where the set of multiple resources include one or more FD resources and obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

A network entity for wireless communication is described. The network entity may include one or more memories storing processor executable code (e.g., instructions), and one or more processors coupled with the one or more memories. The one or more processors may individually or collectively operable to execute the code (e.g., instructions) to cause the network entity to output a control message indicating a set of multiple resources allocated for one or more uplink shared channel messages, the set of multiple resources corresponding to a set of multiple UTOs within a time period of a CG configuration, where the set of multiple resources include one or more FD resources and obtain, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Another network entity for wireless communication is described. The network entity may include means for outputting a control message indicating a set of multiple resources allocated for one or more uplink shared channel messages, the set of multiple resources corresponding to a set of multiple UTOs within a time period of a CG configuration, where the set of multiple resources include one or more FD resources and means for obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

A non-transitory computer-readable medium storing code for wireless communication is described. The code may include instructions executable by one or more processors to output a control message indicating a set of multiple resources allocated for one or more uplink shared channel messages, the set of multiple resources corresponding to a set of multiple UTOs within a time period of a CG configuration, where the set of multiple resources include one or more FD resources and obtain, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Some examples of the method, network entities, and non-transitory computer-readable medium described herein may further include operations, features, means, or instructions for obtaining one or more acknowledgment or negative acknowledgment messages in accordance with an identifier, the identifier based on a first uplink shared channel occasion corresponding to a first UTO of the set of multiple UTOs, where the identifier may be further based on the quantity of unused UTOs excluded from the indication.

Some examples of the method, network entities, and non-transitory computer-readable medium described herein may further include operations, features, means, or instructions for obtaining one or more second uplink shared channel messages during one or more valid UTOs of the set of multiple UTOs in accordance with the CG configuration and outputting the one or more downlink messages during the one or more invalid UTOs.

In some examples of the method, network entities, and non-transitory computer-readable medium described herein, the UCI message may be multiplexed with each of the one or more second uplink shared channel messages that may be obtained during the one or more valid UTOs.

Some examples of the method, network entities, and non-transitory computer-readable medium described herein may further include operations, features, means, or instructions for outputting a semi-static indication of a priority for each of the one or more downlink messages and for each of the one or more uplink shared channel messages, where the one or more invalid UTOs may be excluded based on an uplink shared channel message of the one or more uplink shared channel messages having a first priority and a downlink message of the one or more downlink messages having a second priority higher than the first priority.

Some examples of the method, network entities, and non-transitory computer-readable medium described herein may further include operations, features, means, or instructions for outputting a dynamic indication of a priority for each of the one or more downlink messages and for each of the one or more uplink shared channel messages, where the one or more invalid UTOs may be excluded based on a duration satisfying a threshold duration associated with a downlink message of the one or more downlink messages and the UCI message.

In some examples of the method, network entities, and non-transitory computer-readable medium described herein, the one or more invalid UTOs may be excluded based on a collision between an uplink shared channel message of the one or more uplink shared channel messages and one or more downlink control channel monitoring occasions associated with the one or more FD resources.

In some examples of the method, network entities, and non-transitory computer-readable medium described herein, the one or more invalid UTOs may be excluded based on a collision between an uplink shared channel message of the one or more uplink shared channel messages and one or more SSSs associated with the one or more FD resources.

In some examples of the method, network entities, and non-transitory computer-readable medium described herein, the one or more invalid UTOs may be excluded based on a collision between an uplink shared channel message of the one or more uplink shared channel messages and one or more TRSs associated with the one or more FD resources.

In some examples of the method, network entities, and non-transitory computer-readable medium described herein, the one or more invalid UTOs may be excluded based on a first periodicity associated with the one or more uplink shared channel messages and a second periodicity associated with the one or more downlink messages.

In some examples of the method, network entities, and non-transitory computer-readable medium described herein, the UCI message includes a bitmap including one or more first bits indicating a first subset of the set of multiple UTOs including the quantity of unused UTOs and one or more second bits indicating a second subset of the set of multiple UTOs including a quantity of used UTOs.

DETAILED DESCRIPTION

Figure 1:
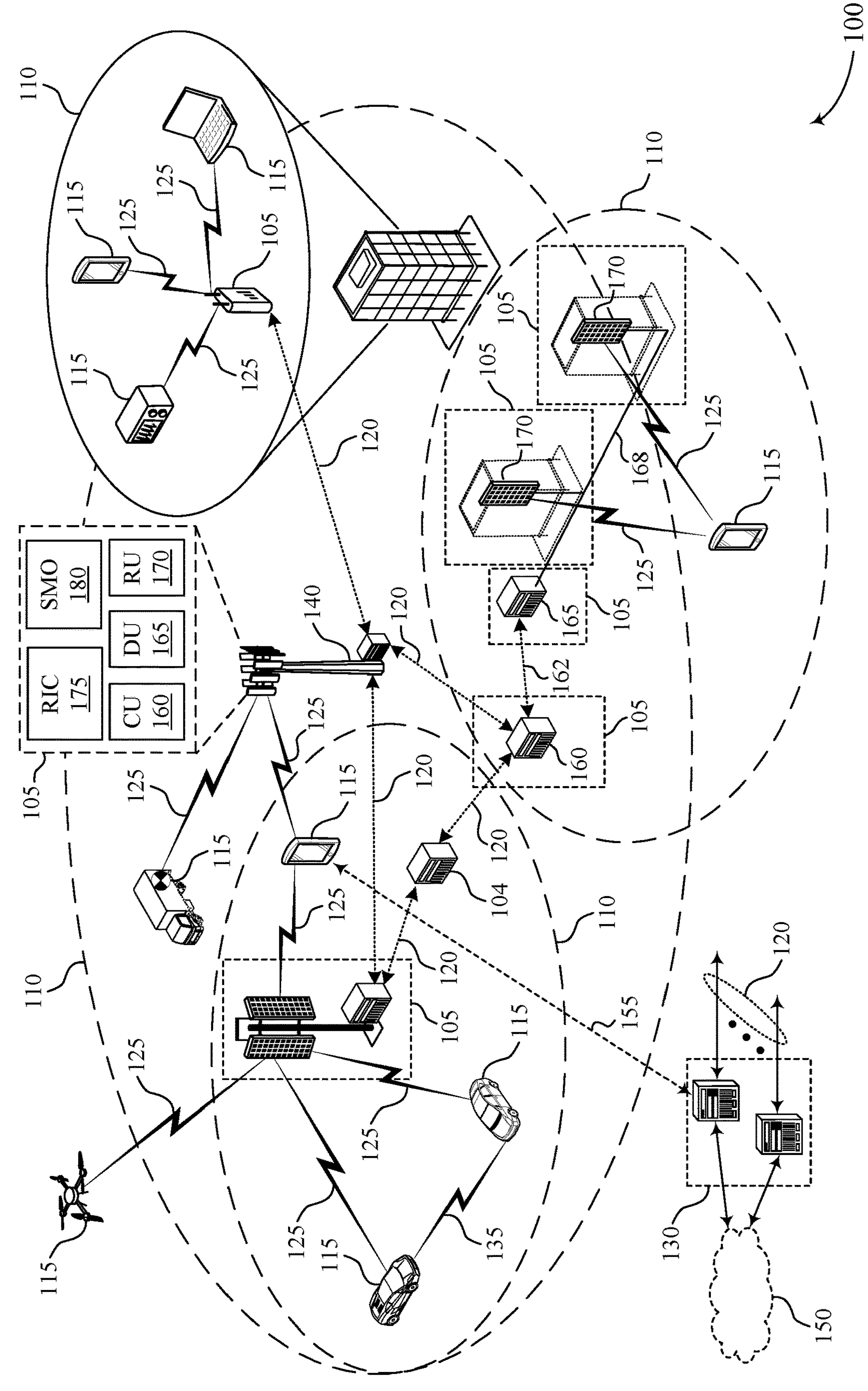
FIG. 1 shows an example of a wireless communications system that supports full-duplex (FD) considerations for configured grant (CG) transmission occasions (TOs) in accordance with one or more aspects of the present disclosure.

A network entity may indicate multiple uplink transmission occasions (UTOs) for use during a configured grant (CG) period. For example, the network entity may configure a UE with multiple CG physical uplink shared channel (PUSCH) transmission occasions (TOs) for transmitting PUSCH messages. The UE may, in some cases, transmit an uplink control information (UCI) message indicating one or more UTOs that are unused (e.g., skipped) by the UE. This UCI may be referred to as a UTO-UCI and may enable enhanced resource usage in a network, for example, by enabling re-allocation of unused resources. In some examples, the UE and the network entity may identify collisions between signaling that may render some UTOs invalid. In such cases, the invalid UTOs may not be indicated via the UTO-UCI, and the UE may therefore not use additional bits in the UCI related to the invalid UTOs, thereby decreasing UCI size and increasing throughput.

Some wireless communications systems may support full-duplex (FD) communications. For example, one or more wireless devices (e.g., a network entity, a UE) may communicate with other wireless devices using FD communication techniques, such as sub-band full-duplex (SBFD) communications, in-band full-duplex (IBFD) communications, among other examples. In such cases, a wireless device may simultaneously receive signaling and transmit signaling via one or more FD resources (e.g., FD slots). A wireless device may operate using FD communications within sub-bands of a component carrier (CC) (e.g., a single CC with defined frequency sub-bands for uplink and downlink communications) or across respective CCs (e.g., a first set of one or more CCs for uplink communications and a second set of one or more CCs for downlink communications). In some cases, however, collisions between uplink signaling and downlink signaling may be introduced in FD communications. For example, in SBFD, a network entity may support simultaneous transmission and reception with half-duplex (HD) UEs using uplink sub-bands and downlink sub-bands, and the UEs may in some cases experience conflicts between uplink and downlink messages. Although UEs and network entities may include conflict handling rules for SBFD, such devices may lack protocols and rules for identifying invalid UTOs in SBFD. As such, conventional techniques may result in UEs indicating an invalid UTO via the UTO-UCI, which may result in excess resource usage (e.g., additional bits unnecessarily included in the UTO-UCI) and decreased system efficiency.

As described herein, a network may define invalid UTOs for SBFD. For example, a UE may consider UTOs (e.g., CG-PUSCH TOs) that overlap with one or more downlink messages as invalid, and may remove bits that would otherwise indicate such occasions from UCI (e.g., UTO-UCI) to include additional information or reduce a size of the message. Further, a UE may exclude invalid occasions when determining a feedback identification (ID), such as for hybrid automatic repeat request (HARQ) ID calculation, which may increase efficiency of HARQ ID management. UEs may consider UTOs as invalid due to collisions with physical downlink control channel (PDCCH) monitoring occasions, collisions with search space sets (SSSs), or collisions with tracking reference signals (TRSs). Validity of UTOs in SBFD may further be defined based on conflicting message priorities, periodicities, or persistent nature. UEs and network entities may also define invalid and valid UTOs based on a timing offset threshold between an indication and transmission of a UCI.

Aspects of the disclosure are initially described in the context of wireless communications systems. Aspects of the disclosure are further illustrated by and described with reference to signaling diagrams, resource allocation diagrams, and process flows that relate to FD considerations for CG TOs. Aspects of the disclosure are further illustrated by and described with reference to apparatus diagrams, system diagrams, and flowcharts that relate to FD considerations for CG TOs.

FIG. 1 shows an example of a wireless communications system 100 that supports FD considerations for CG TOs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support FD considerations for CG TOs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SSSs, and each SSS may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. SSSs may include common SSSs configured for sending control information to multiple UEs 115 and UE-specific SSSs for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as HD communications (e.g., a mode that supports one-way communication via transmission or reception, but not transmission and reception concurrently). In some examples, HD communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol).

In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the wireless communications system 100 may support protocols involving invalid UTOs defined for SBFD communications. For example, a UE 115 may determine that one or more PUSCH TOs at least partially overlap with one or more downlink messages or monitoring occasions, and the UE 115 may remove bits in a UCI transmitted to a network entity 105 that would otherwise be used to indicate such invalid occasions. The UE 115 may, for example, include additional information in place of the removed bits, or may reduce a size of the message. Further, the UE 115 may exclude such invalid occasions in determination of a feedback ID (e.g., HARQ ID).

Figure 2:
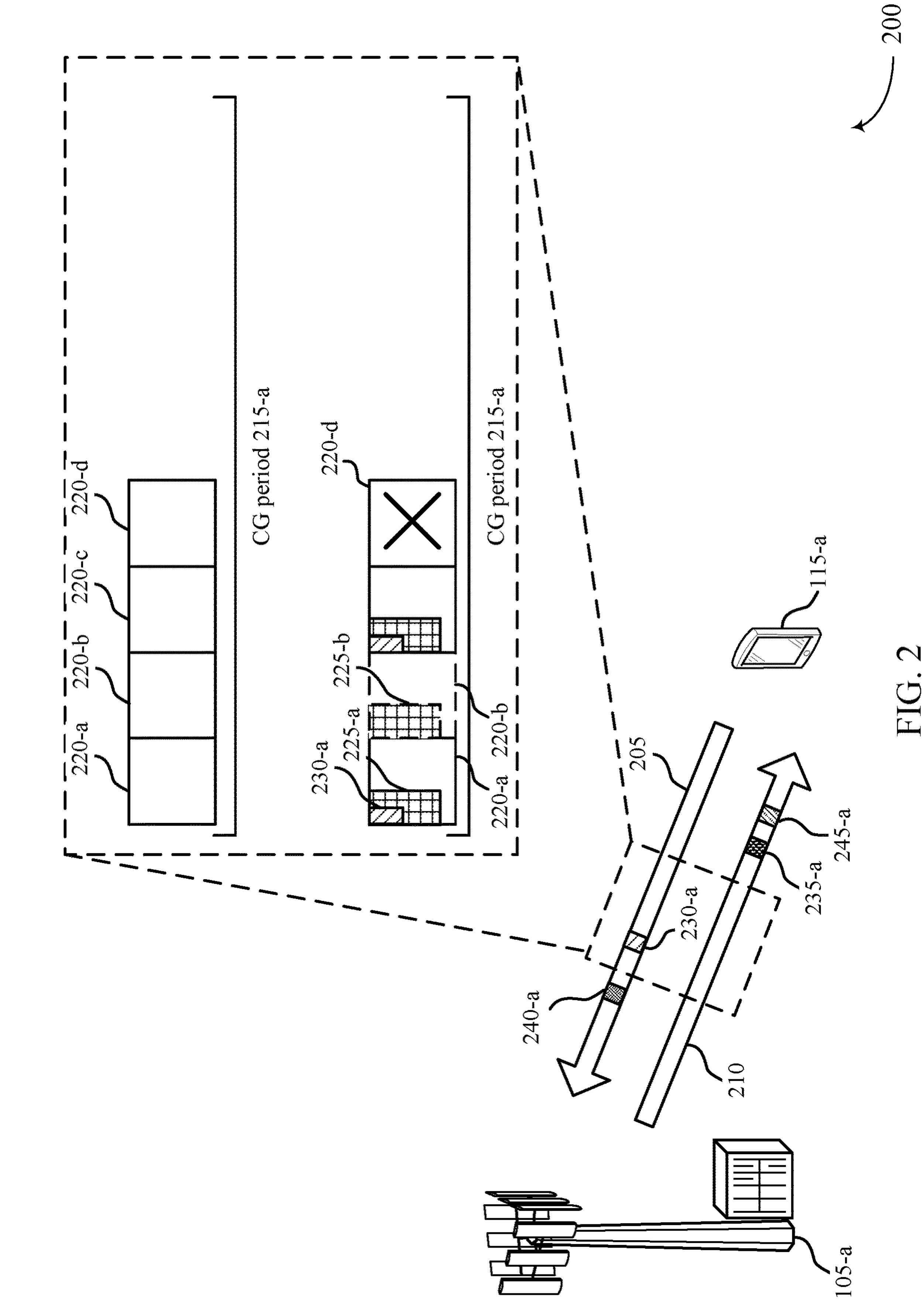
FIG. 2 shows an example of a wireless communications system that supports FD considerations for CG TOs in accordance with one or more aspects of the present disclosure.

FIG. 2 shows an example of a wireless communications system 200 that supports FD considerations for CG TOs in accordance with one or more aspects of the present disclosure. The wireless communications system 200 may implement or be implemented to realize aspects of the wireless communications system 100. For example, the wireless communications system 200 may illustrate signaling between a UE 115-*a* and a network entity 105-*a*, which may represent a UE 115 and a network entity 105 as described with respect to FIG. 1. The UE 115-*a* and the network entity 105-*a* may further communicate using an uplink communication link 205 and a downlink communication link 210, which may be examples of communication links 125. In some examples, the wireless communications system 200 may support exclusion of invalid UTOs in SBFD communications in UCI messaging and HARQ ID determination as described herein.

In some examples, the UE 115-*a* and the network entity 105-*a* may support communications during a CG period 215-*a* based on a prior configuration. For example, the UE 115-*a* may receive a control message 235-*a* (e.g., a semi-static message) indicating resources for a CG, including four UTOs (e.g., CG-PUSCH TOs) 220-*a*, 220-*b*, 220-*c*, and 220-*d* within a CG period 215-*a*. The message 225-*a* (e.g., a control message, a message corresponding to a PUCCH) may be based on a prior RRC information element (IE) (e.g., ConfiguredGrantConfig) that defines periodicity, timers, resources, and other parameters for the CG. In some cases, multiple UTOs may be allocated in each CG period of each cycle of traffic (e.g., uplink traffic, downlink traffic) for the UE 115-*a*. For example, the UTOs 220-*a* through 220-*d* may be used for transmitting messages 225, which may be examples of data bursts of uplink traffic for extended reality (XR) video, such as augmented reality (AR) video or virtual reality (VR) video. The start of the CG period 215-*a* may also be aligned with a corresponding data generation cycle. The pre-configured CG resources may allow the UE 115-*a* to reduce uplink transmission latency in comparison to using a scheduling request (SR) and buffer status report (BSR)-based resource request, which may result in relatively higher uplink data rates and lower latency periodic traffic. For example, the UE 115-*a* may immediately begin transmitting PUSCH messages during the UTOs 220-*a* through 220-*d* after data arrives in an uplink data buffer of the UE 115-*a* without additional overhead signaling. In some examples, the CG may be referred to as a multi-PUSCH CG if the CG includes multiple CG-PUSCH TOs.

The UE 115-*a* may also support indicating UTOs that are not used in uplink data transmission via UCI (e.g., UTO-UCI) so that the network entity 105-*a* may reallocate unused resources to other UEs 115. For example, the UE 115-*a* may determine to transmit data (e.g., AR traffic via PUSCH) in the UTOs 220-*a*, 220-*b*, and 220-*c*, but may not have enough data to transmit in the UTO 220-*d*. The UE 115-*a* may transmit a bitmap in a UCI indicating that the UTOs 220-*a* through 220-*c* are used and that the UTO 220-*d* is unused. In some examples, the network entity 105-*a* may configure the UE 115-*a* to transmit UCI indicating unused UTOs, and in some cases may configure the UE 115-*a* to transmit the UCI in each transmitted message 225 (e.g., multiplexed with or as part of) of the CG period 215-*a* for each used UTO.

Invalid UTOs may be defined for techniques associated with multiple UTOs (e.g., multi-PUSCH CG) and for UTO-UCI. For example, for unpaired spectrum (e.g., in TDD), the UE 115-*a* and the network entity 105-*a* may determine that a CG PUSCH TO is invalid if the occasion collides with one or more downlink symbols indicated by one or more provided parameters (e.g., indicated by tdd-UL-DL-ConfigurationCommon or tdd-UL-DL-ConfigurationDedicated if provided). Additionally, or alternatively, the network entity 105-*a* and the UE 115-*a* may determine that a CG PUSCH TO is invalid if the occasion collides with one or more symbols of a synchronization signal (SS)/physical broadcast channel (PBCH) block (SSB), where an index may be provided by a second parameter (e.g., by ssb-PositionsInBurst). Such collisions may also include collisions with synchronization signal blocks (SSBs) for inter-cell multi-TRP communications. Dynamic collision and dynamic cancellation of CG PUSCH may in some cases not be considered in invalid CG PUSCH TO determination. In some examples, the UE 115-*a* may not indicate skipping over such occasions as these may not be used regardless and may be known by both the UE and the network entity. For example, invalid UTO statuses (e.g., used or unused) may be excluded in UTO-UCI to reduce UTO-UCI payload size. Further, invalid occasions may be excluded from HARQ ID determination to increase efficiency for HARQ ID management.

The UE 115-*a* and the network entity 105-*a* may further support SBFD communications. For example, the network entity 105-*a* may support one or more sub-bands (of a band of frequencies) for uplink communications and one or more sub-bands for one or more downlink communications, and may both receive and transmit messaging simultaneously using the different sub-bands. In contrast, the UE 115-*a* may be an HD UE, and may determine whether to transmit or receive in one or more SBFD symbols based on dynamic scheduling (e.g., monitoring PDCCH candidates) or semi-static signaling (e.g., from the network entity 105-*a*). In some cases, the UE 115-*a* may receive an RRC message (e.g., including a CG configuration) indicating a default behavior of using uplink or downlink. As the UE 115-*a* may be aware of and able to communicate with the network entity 105-*a* supporting FD and SBFD communications, the UE 115-*a* may be referred to as an FD-capable UE or an SBFD-aware UE, or some similar terminology. For example, after establishing a connection with a network (e.g., moving to an RRC connected state or mode), the UE 115-*a* may be aware of SBFD and TDD configurations supported at the network entity 105-*a*. In some examples, the UE 115-*a* and the network entity 105-*a* may support SBFD in XR applications to improve coverage and reduce uplink latency.

SBFD communication may result in additional collisions in communications at the HD UE 115-*a*. For example, one or more SBFD symbols for one or more scheduled uplink transmissions may overlap with one or more symbols for one or more scheduled downlink transmissions. In some cases, uplink and downlink collision handling rules may be defined at the UE 115-*a* (or indicated via a configuration message) for SBFD to allow the UE 115-*a* to decide whether to transmit or receive. For example, the UE 115-*a* may be configured to prioritize PDCCH monitoring occasions and TRSs over semi-static PUSCH messaging when such messages collide in SBFD communications. However, some UEs and network entities may lack definitions, rules, or protocols for invalidating UTOs in SBFD, for example, based on such collision handling.

As described herein, the UE 115-*a* may determine that one or more UTOs are invalid for SBFD communications. For example, the UE 115-*a* may transmit a UCI message 230-*a* indicating a quantity of unused UTOs (e.g., the UTO 220-*d*) that may exclude one or more invalid UTOs 220 in favor of additional information or to reduce a size of the UCI. In some examples, the UE 115-*a* may invalidate the UTO 220-*b* based on a collision of the message 225-*b* with a scheduled semi-static downlink message, such as a TRS or PDCCH monitoring occasion. The UE 115-*a* may also determine a HARQ ID based on (e.g., using) the UTOs 220-*a* (e.g., a first configured CG-PUSCH TO, whether valid or invalid) and based on the UTOs 220-*b* and 220-*d* (e.g., subsequent valid CG-PUSCH TOs) but excluding the invalid UTO 220-*c*. For example, the UE 115-*a* may transmit an acknowledgment (ACK) or negative acknowledgment (NACK) message 240-*a* (e.g., HARQ-ACK) in accordance with a HARQ ID, where the UE 115-*a* may not indicate that the HARQ ID (e.g., process number) is not incremented for such invalid occasions. Additionally, or alternatively, the UE 115-*a* may receive one or more indications, such as an indication 245-*a*, that may include updates to one or more conflict handling rules (e.g., due to priority, indicating updated priorities, indicating other handling rules).

Figure 3:
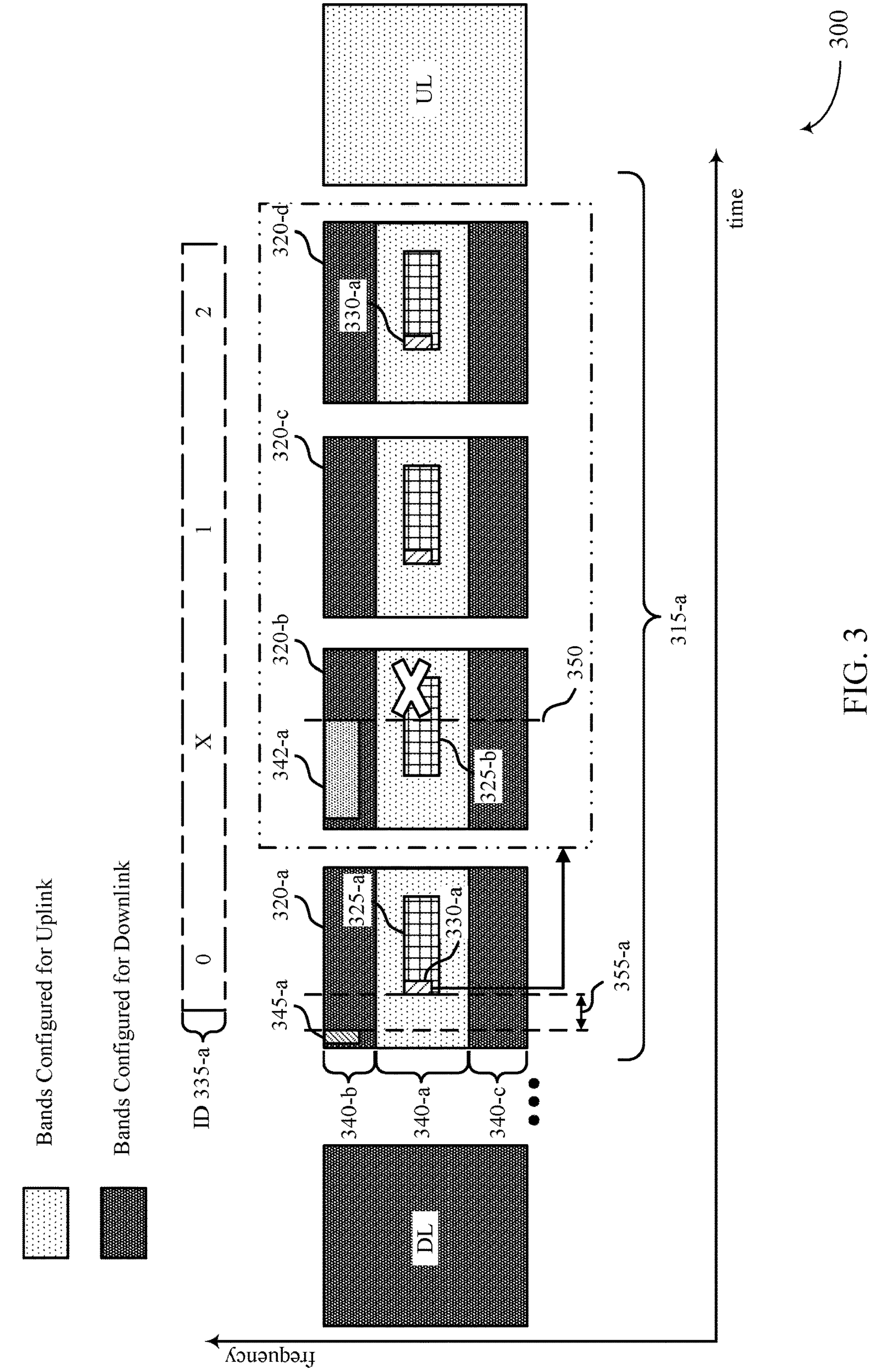
FIG. 3 shows an example of a resource allocation diagram that supports FD considerations for CG TOs in accordance with one or more aspects of the present disclosure.

FIG. 3 shows an example of a resource allocation diagram 300 for a wireless communications system that supports FD considerations for CG TOs in accordance with one or more aspects of the present disclosure. The resource allocation diagram 300 may implement or be implemented to realize aspects of the wireless communications system 100 and the wireless communications system 200. For example, the resource allocation diagram 300 may illustrate an example resource allocation for messaging between the UE 115-*a* and the network entity 105-*a* in SBFD communication, where the network entity 105-*a* and the UE 115-*a* may be configured with sub-bands 340-*a* for uplink communications and sub-bands 340-*b* and 340-*c* for downlink communications. In the example illustrated in FIG. 3, the UCI 330-*a* (e.g., a UCI message) may indicate UTOs 320-*a*, 320-*b*, 320-*c*, and 320-*d* for transmission of one or more uplink messages 325 within a CG period 315-*a* of a CG configuration. The CG period 315-*a* may be between a period for downlink signaling and a period for uplink signaling. The UE 115-*a* may support identifying invalid UTOs in SBFD resources, as described herein.

In some examples, for the UE 115-*a* (e.g., an SBFD-aware UE), a UTO 320 (e.g., a CG-PUSCH TO, a TO for transmitting PUSCH) in an SBFD symbol may be considered invalid due to a collision with one or more downlink messages or monitoring occasions, including PDCCH monitoring occasions, SSSs, and TRSs. For example, the UE 115-*a* may have a downlink message 342-*a* (or monitoring occasion) scheduled during one or more symbols of the UTO 320-*b*, where the downlink message 342-*a* may be any of a PDCCH monitoring occasion (e.g., for receiving one or more PDCCH messages), an SSS, or a TRS. The UE 115-*a* may also have an uplink message 325-*b* (e.g., CG-PUSCH) scheduled during one or more symbols of the UTO 320-*b*, where symbols of the downlink message 342-*a* may overlap at least partially with those of the uplink message 325-*b*, for example, at time 350. Based on the overlap, the UE 115-*a* may determine that the UTO 320-*b* is invalid.

In some examples, the UE 115-*a* may transmit a UCI based on the invalid occasion. For example, a UTO-UCI window of indication for a UCI 330-*a* may have a bitmap size of 3 occasions subsequent to the first UTO 320-*a* (e.g., size corresponding to remaining UTOs 320-*b*, 320-*c*, and

320-*d*). However, the indication may not span the UTO 320-*b* and uplink message 325-*b* due to the collision with the downlink message 342-*a*. For example, the UCI 330-*a* may indicate a bitmap of [1, 1] to indicate the last two UTOs while excluding a bit for the invalid UTO 320-*b*. In some examples, the UCI 330-*a* may indicate a value of "0" for any UTOs 320 that are not used. In some examples, the UE 115-*a* may transmit the UCI 330-*a* in each uplink message 325 that is transmitted during the used occasions, including UTOs 320-*a*, 320-*c* and 320-*d*. Further, the UE 115-*a* may transmit the UCI 330-*a* in the first UTO 320-*a* of the CG period 315-*a* (e.g., with an uplink message 325-*a*) regardless of whether the first occasion is valid or invalid. In some aspects, for an SBFD UE (e.g., SBFD-UE), the $O^{UTO-UCI}$ subsequent CG-PUSCH TOs may exclude invalid TOs where a UE does not transmit a CG-PUSCH due to collision of the CG-PUSCH with PDCCH monitoring occasions, SSSs, or TRSs, or any combination thereof. By excluding such UTOs, a UE may use the spare bits to indicate skipping over valid occasions or to decrease a size of an RRC configured bitmap, which may increase a throughput of communications.

Additionally, or alternatively, a HARQ ID may be determined for a first configured UTO and subsequent valid UTOs within a CG period and not for invalid UTOs. For example, the UE 115-*a* may determine an ID 335-*a*, such as a HARQ ID, based on incrementing for valid UTOs 320 (e.g., CG PUSCH TOs) after the first configured UTO 320-*a* in the CG period 315-*a*. For example, the HARQ ID may increment according to [0, –, 1, 2] where "–" may represent skipping incrementing of the ID due to the collision in the UTO 320-*b*. In some aspects, when a quantity of slots (e.g., nrofSlots_InCGperiod) is configured for Type 1 CG or Type 2 CG, a HARQ process ID for the $K^{th}$ (e.g., $1<K\leq$nrofSlots_InCGperiod) valid configured PUSCH grant is determined, excluding invalid configured PUSCH grant(s) that are not transmitted due to collision of the PUSCH with PDCCH monitoring occasions, SSSs, or TRSs. Such exclusion may improve HARQ ID management (e.g., for XR UEs in SBFD) while maintaining reduced latency by using multiple UTOs per CG period.

In some examples, the UE 115-*a* may receive an indication 345-*a* from the network entity 105-*a* to semi-statically update one or more conflict handling (e.g., dropping) rules. For example, an indication 345-*a* may be received by the UE 115-*a* that may indicate respective priorities for CG PUSCHs, TRSs, SSSs, PDCCCH monitoring occasions, among other semi-static signaling and uplink and downlink signaling, and the UE 115-*a* may determine that a UTO is invalid or valid and to drop the UTO based on the indication. In some examples, the indication may indicate to prioritize semi-persistent messaging or persistent messaging, or to prioritize semi-periodic messaging or periodic messaging. Further, the indication may indicate to prioritize signaling based on periodicity of one or more messages. The UE 115-*a* may also receive dynamic indications (e.g., one or more indications 345-*a*) to dynamically update conflict handling rules. In some examples, the indications may be received via MAC-CE, DCI, or another type of signaling.

The network entity 105-*a* or the UE 115-*a* may also define a threshold duration 355-*a* for determining when to invalidate and exclude UTOs 320. A threshold duration 355-*a* may be a time offset threshold (e.g., a minimum time offset threshold, Toffset) between an end of a received indication 345-*a* that results in cancellation of one or more UTOs 320 and a start time for transmitting the UCI 330-*a*. For example, the indication 345-*a* may result in cancellation of the uplink message 325-*b* in UTO 320-*b* due to an updated priority indicating a higher priority for the downlink message 342-*a*. If the offset (e.g., difference) in the time domain between the end of the indication 345-*a* and the start of the UCI 330-*a* (e.g., a start of the PUSCH that carries the UCI 330-*a* (e.g., a UTO-UCI)) is smaller (e.g., shorter in duration) than the threshold, the UCI 330-*a* may not be affected by the newly-updated priorities. For example, the UE 115-*a* may not cancel and invalidate subsequent transmissions due to the updated priorities if the threshold is not satisfied. Otherwise, the UCI 330-*a* may be affected by the higher-priority downlink message and may indicate skipping over one or more of the remaining occasions. In some examples, the threshold duration 355-*a* may be based on a PUSCH preparation time $N_2$ Or $T_{proc,2}$. Additionally, or alternatively, the UE 115-*a* may receive dynamic updates to priority or persistence/periodicity related to signaling to change conflict handling (e.g., dropping) rules. For example, for a dynamic update in the indication 345-*a*, the UE 115-*a* may update the UTO-UCI (and cancel the indication CG-PUSCHs accordingly) if the dynamic update is provided earlier than the threshold duration 355-*a*.

Figure 4:
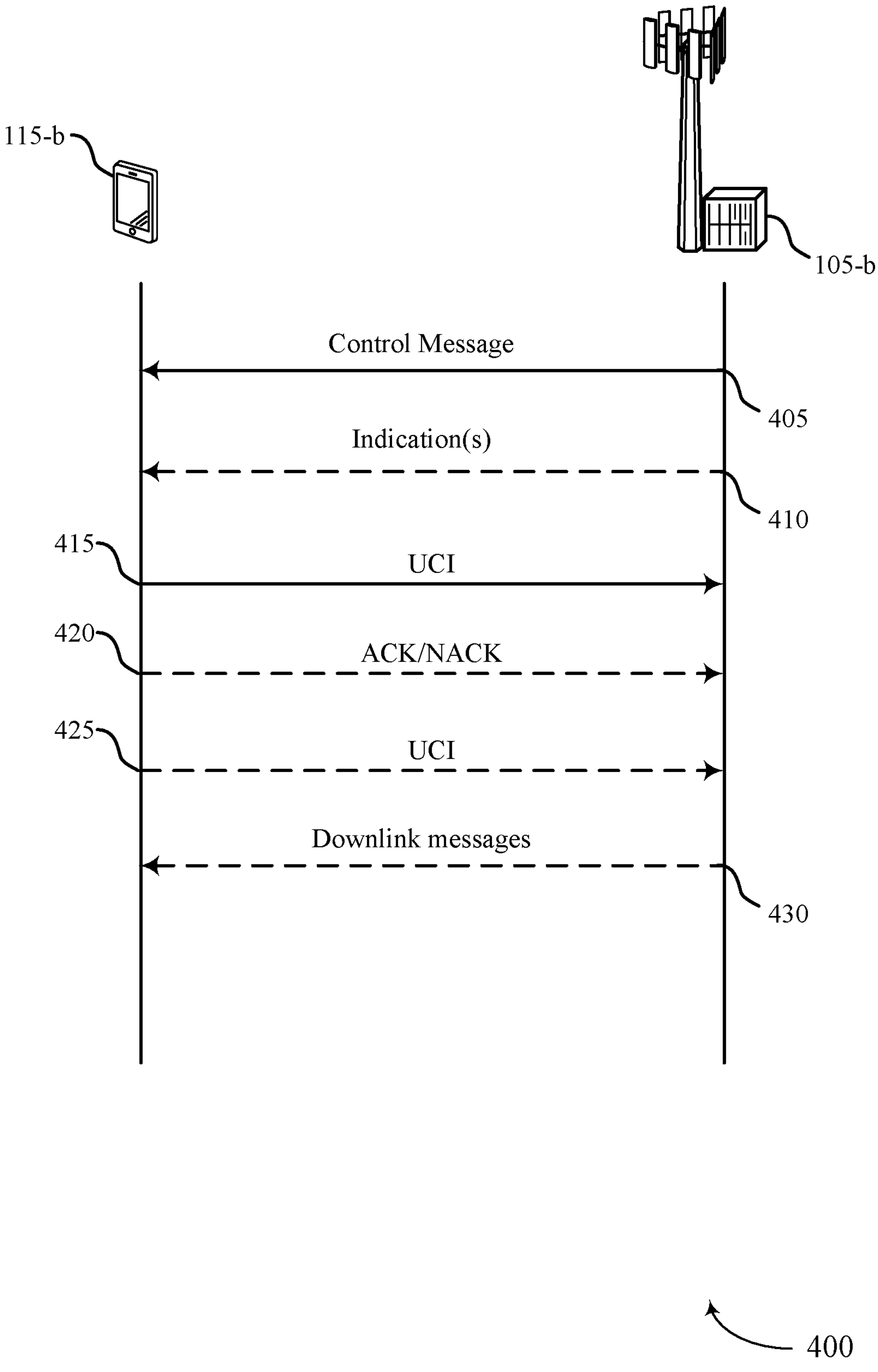
FIG. 4 shows an example of a process flow that supports FD considerations for CG TOs in accordance with one or more aspects of the present disclosure.

FIG. 4 shows an example of a process flow 400 that supports FD considerations for CG TOs in accordance with one or more aspects of the present disclosure. The process flow 400 may implement or be implemented to realize aspects of the wireless communications system 100, the wireless communications system 200, and the resource allocation diagram 300. For example, the process flow 400 may be implemented by a UE 115-*b* and a network entity 105-*b* which may be examples of the corresponding devices described herein, including with reference to FIGS. 1-3.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the UE 115-*b* may receive, and the network entity 105-*b* may output (e.g., transmit via a transmitting device of or coupled with the network entity 105-*b*), a control message indicating a set of multiple resources allocated for one or more uplink shared channel messages. In some examples, the set of multiple resources may correspond to a set of multiple uplink transmission occasions (e.g., UTOs) within a time period of a CG configuration. The set of multiple resources may include one or more FD resources.

At 410, the UE 115-*b* may optionally receive, and the network entity 105-*b* may optionally output, an indication. For example, the UE 115-*b* may receive a semi-static indication of a priority for each of one or more downlink messages and for each of the one or more uplink shared channel messages. Additionally, or alternatively, the UE 115-*b* may receive a dynamic indication of a priority for each of the one or more downlink messages and for each of the one or more uplink shared channel messages.

At 415, the UE 115-*b* may transmit, and the network entity 105-*b* may obtain (e.g., receive via a receiving device of or coupled with the network entity 105-*b*), a UCI message including an indication of a quantity of unused UTOs of the set of multiple UTOs. For example, the UE 115-*b* may transmit a UCI using, or during, at least one of the set of multiple UTOs in accordance with the CG configuration. In some examples, the indication may exclude one or more invalid UTOs that are based on a collision between one or more downlink messages and the one or more uplink shared channel messages associated with the one or more FD resources.

In some examples, based on receiving the semi-static indication at 410, the one or more invalid UTOs may be excluded based on an uplink shared channel message of the one or more uplink shared channel messages having a first priority and a downlink message of the one or more downlink messages having a second priority higher than the first priority. Additionally, or alternatively, based on receiving the dynamic indication at 410, the one or more invalid UTOs may be excluded based on a duration satisfying (e.g., equal to, less than, exceeding) a threshold duration, the duration being between an end of receiving the dynamic indication and a start time for transmitting the UCI message.

In some examples, the one or more invalid UTOs may be excluded based on a collision between an uplink shared channel message of the one or more uplink shared channel messages and one or more downlink control channel monitoring occasions associated with the one or more FD resources. Additionally, or alternatively, the one or more invalid UTOs may be excluded based on a collision between an uplink shared channel message of the one or more uplink shared channel messages with one or more SSSs associated with the one or more FD resources, with one or more TRSs associated with the one or more FD resources, or both. Additionally, or alternatively, the one or more invalid UTOs may be excluded based on a first periodicity associated with the one or more uplink shared channel messages and a second periodicity associated with the one or more downlink messages.

In some examples, the UCI message may include a bitmap. The bitmap may include one or more first bits indicating a first subset of the set of multiple UTOs including the quantity of unused UTOs as well as one or more second bits indicating a second subset of the set of multiple UTOs including a quantity of used UTOs.

At 420, the UE 115-*b* may optionally transmit, and the network entity 105-*b* may optionally obtain, one or more ACK or NACK messages (e.g., HARQ-ACK/NACK for feedback) in accordance with an identifier (e.g., a HARQ process ID). The identifier may be based on a first uplink shared channel occasion corresponding to a first UTO of the set of multiple UTOs, and may be further based on the quantity of unused UTOs excluded from the indication.

At 425, the UE 115 may optionally transmit, and the network entity 105-*b* may optionally obtain, one or more second uplink shared channel messages during one or more valid UTOs of the set of multiple UTOs in accordance with the CG configuration. In some examples, the UCI message may be multiplexed with each of the one or more second uplink shared channel messages that are transmitted during the one or more valid UTOs.

At 430, the UE 115 may optionally receive, and the network entity 105-*b* may optionally output, the one or more downlink messages during the one or more invalid UTOs.

Figure 5:
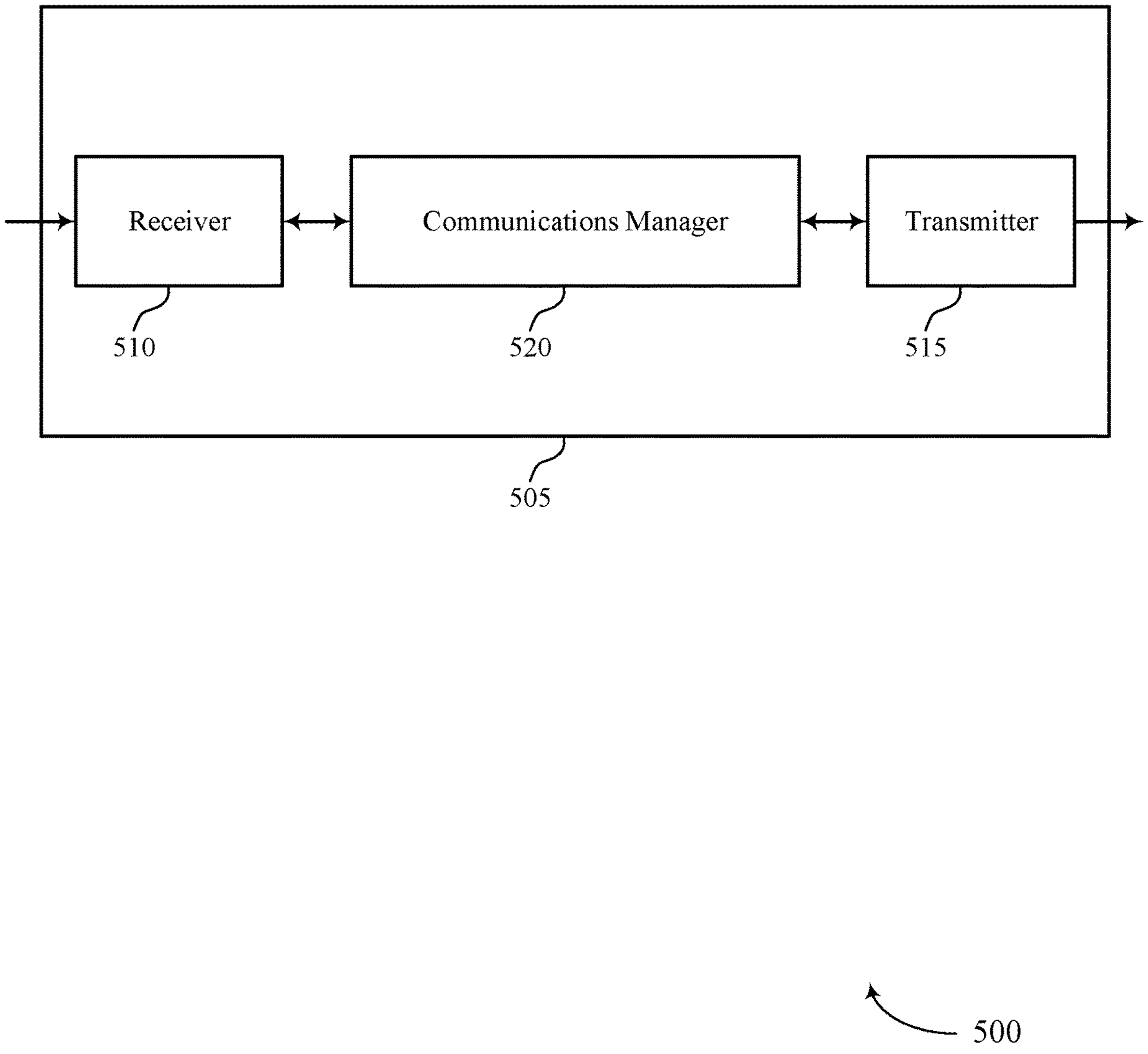
FIGS. 5 and 6 show block diagrams of devices that support FD considerations for CG TOs in accordance with one or more aspects of the present disclosure.

FIG. 5 shows a block diagram 500 of a device 505 that supports FD considerations for CG TOs in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to FD considerations for CG TOs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to FD considerations for CG TOs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of FD considerations for CG TOs as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving a control message indicating a set of multiple resources allocated for one or more uplink shared channel messages, the set of multiple resources corresponding to a set of multiple UTOs within a time period of a CG configuration, where the set of multiple resources include one or more FD resources. The communications manager 520 is capable of, configured to, or operable to support a means for transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources by supporting exclusion of invalid UTOs in UTO-UCI and HARQ-ID determination for SBFD and other FD communications as well as supporting additional conflict handling rules in SBFD.

Figure 6:
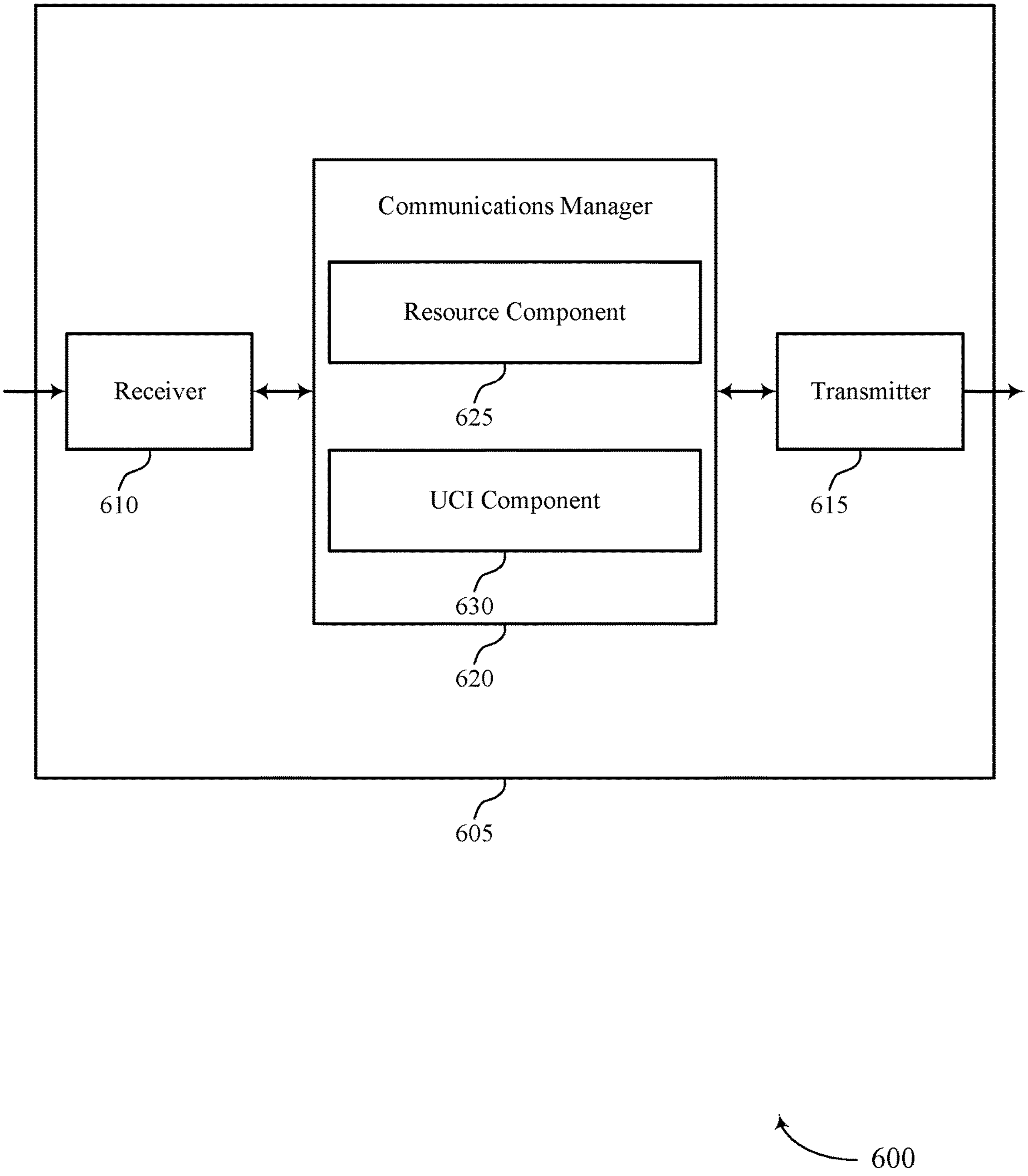

FIG. 6 shows a block diagram 600 of a device 605 that supports FD considerations for CG TOs in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to FD considerations for CG TOs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to FD considerations for CG TOs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of FD considerations for CG TOs as described herein. For example, the communications manager 620 may include a resource component 625 a UCI component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The resource component 625 is capable of, configured to, or operable to support a means for receive a control message indicating a set of multiple resources allocated for one or more uplink shared channel messages, the set of multiple resources corresponding to a set of multiple UTOs within a time period of a CG configuration, where the set of multiple resources include one or more FD resources. The UCI component 630 is capable of, configured to, or operable to support a means for transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Figure 7:
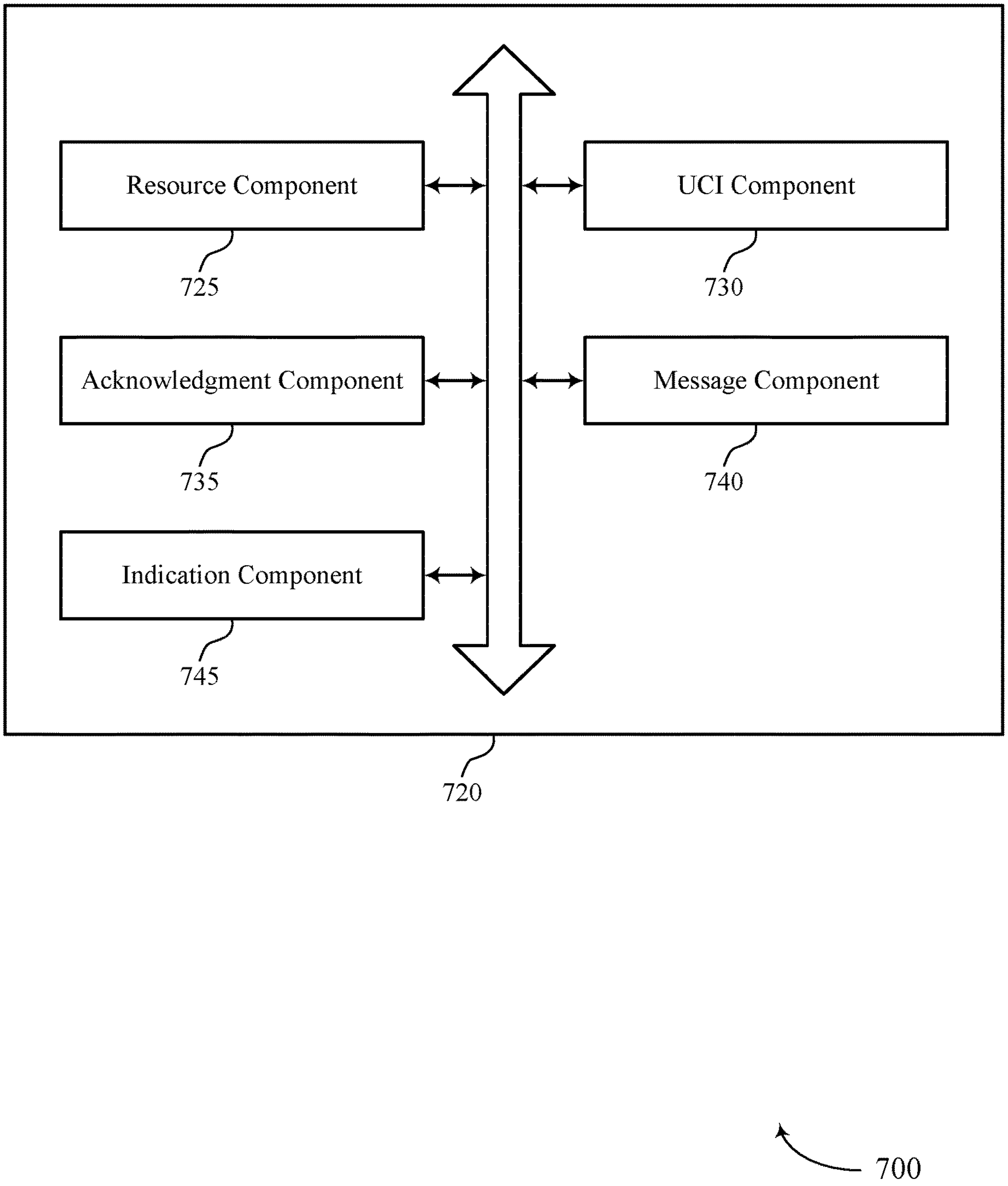
FIG. 7 shows a block diagram of a communications manager that supports FD considerations for CG TOs in accordance with one or more aspects of the present disclosure.

FIG. 7 shows a block diagram 700 of a communications manager 720 that supports FD considerations for CG TOs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of FD considerations for CG TOs as described herein. For example, the communications manager 720 may include a resource component 725, a UCI component 730, an acknowledgment component 735, a message component 740, an indication component 745, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The resource component 725 is capable of, configured to, or operable to support a means for receive a control message indicating a set of multiple resources allocated for one or more uplink shared channel messages, the set of multiple resources corresponding to a set of multiple UTOs within a time period of a CG configuration, where the set of multiple resources include one or more FD resources. The UCI component 730 is capable of, configured to, or operable to support a means for transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

In some examples, the acknowledgment component 735 is capable of, configured to, or operable to support a means for transmitting one or more acknowledgment or negative acknowledgment messages in accordance with an identifier, the identifier based on a first uplink shared channel occasion corresponding to a first UTO of the set of multiple UTOs, where the identifier is further based on the quantity of unused UTOs excluded from the indication.

In some examples, the message component 740 is capable of, configured to, or operable to support a means for transmitting one or more second uplink shared channel messages during one or more valid UTOs of the set of multiple UTOs in accordance with the CG configuration. In some examples, the message component 740 is capable of, configured to, or operable to support a means for receiving the one or more downlink messages during the one or more invalid UTOs.

In some examples, the UCI message is multiplexed with each of the one or more second uplink shared channel messages that are transmitted during the one or more valid UTOs.

In some examples, the indication component 745 is capable of, configured to, or operable to support a means for receiving a semi-static indication of a priority for each of the one or more downlink messages and for each of the one or more uplink shared channel messages, where the one or more invalid UTOs are excluded based on an uplink shared channel message of the one or more uplink shared channel messages having a first priority and a downlink message of the one or more downlink messages having a second priority higher than the first priority.

In some examples, the indication component 745 is capable of, configured to, or operable to support a means for receiving a dynamic indication of a priority for each of the one or more downlink messages and for each of the one or more uplink shared channel messages, where the one or more invalid UTOs are excluded based on a duration satisfying a threshold duration, the duration being between an end of receiving the dynamic indication and a start time for transmitting the UCI message.

In some examples, the one or more invalid UTOs are excluded based on a collision between an uplink shared channel message of the one or more uplink shared channel messages and one or more downlink control channel monitoring occasions associated with the one or more FD resources.

In some examples, the one or more invalid UTOs are excluded based on a collision between an uplink shared channel message of the one or more uplink shared channel messages and one or more SSSs associated with the one or more FD resources.

In some examples, the one or more invalid UTOs are excluded based on a collision between an uplink shared channel message of the one or more uplink shared channel messages and one or more TRSs associated with the one or more FD resources.

In some examples, the one or more invalid UTOs are excluded based on a first periodicity associated with the one or more uplink shared channel messages and a second periodicity associated with the one or more downlink messages.

In some examples, the UCI message includes a bitmap including one or more first bits indicating a first subset of the set of multiple UTOs including the quantity of unused UTOs and one or more second bits indicating a second subset of the set of multiple UTOs including a quantity of used UTOs.

Figure 8:
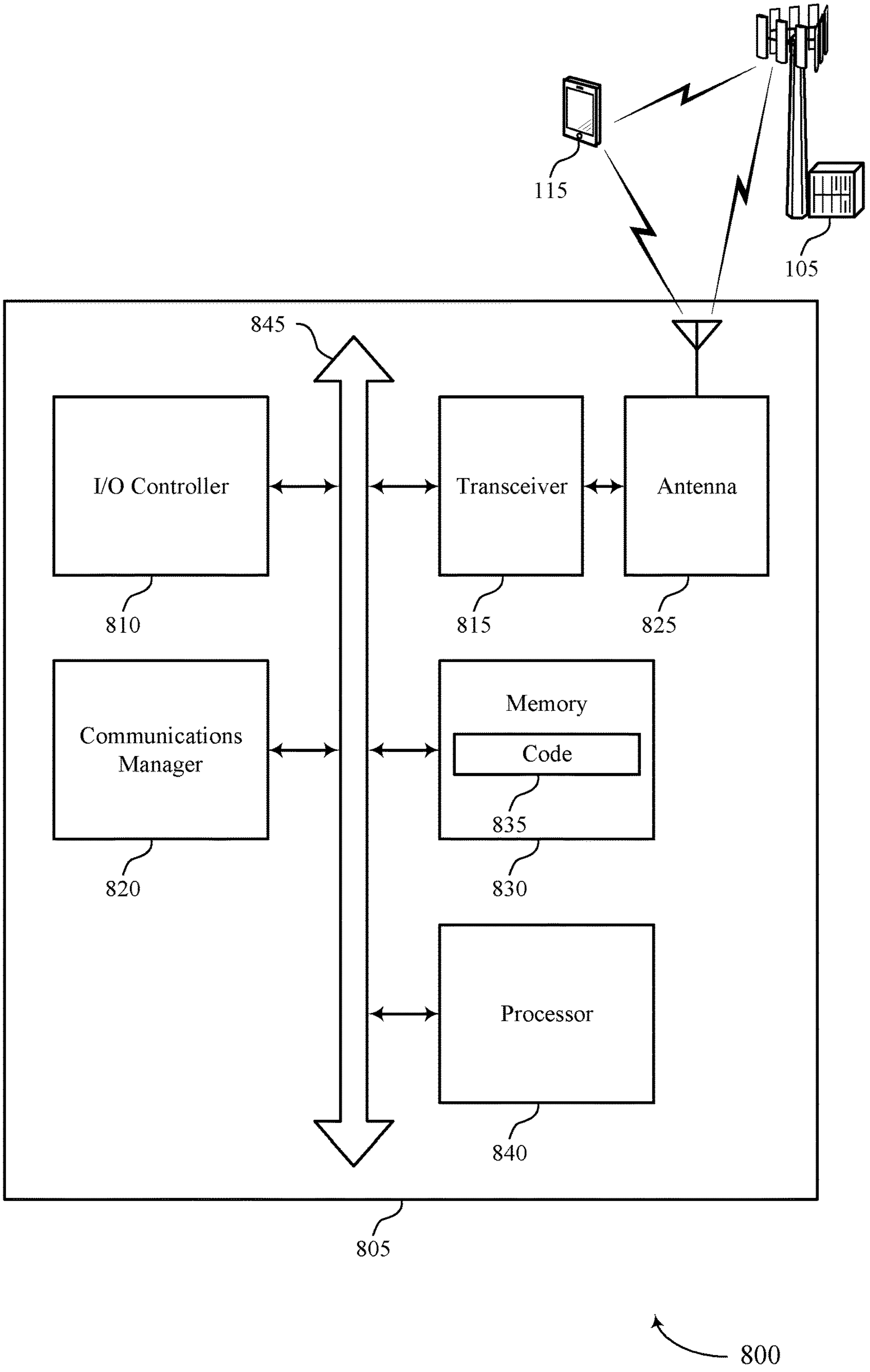
FIG. 8 shows a diagram of a system including a device that supports FD considerations for CG TOs in accordance with one or more aspects of the present disclosure.

FIG. 8 shows a diagram of a system 800 including a device 805 that supports FD considerations for CG TOs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS)

which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting FD considerations for CG TOs). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving a control message indicating a set of multiple resources allocated for one or more uplink shared channel messages, the set of multiple resources corresponding to a set of multiple UTOs within a time period of a CG configuration, where the set of multiple resources include one or more FD resources. The communications manager 820 is capable of, configured to, or operable to support a means for transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

By including or configuring the communications manager 820 in accordance with examples as described herein, the device 805 may support techniques for reduced latency, reduced power consumption and longer battery life, more efficient utilization of communication resources, improved utilization of processing capability, and improved user experience related to reduced processing by supporting exclusion of invalid UTOs in UTO-UCI and in HARQ ID determination for FD including SBFD communications, as well as supporting additional conflict handling rules in SBFD.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of FD considerations for CG TOs as described herein, or the at least one processor 840 and the at least one memory 830 may be otherwise configured to, individually or collectively, perform or support such operations.

Figure 9:
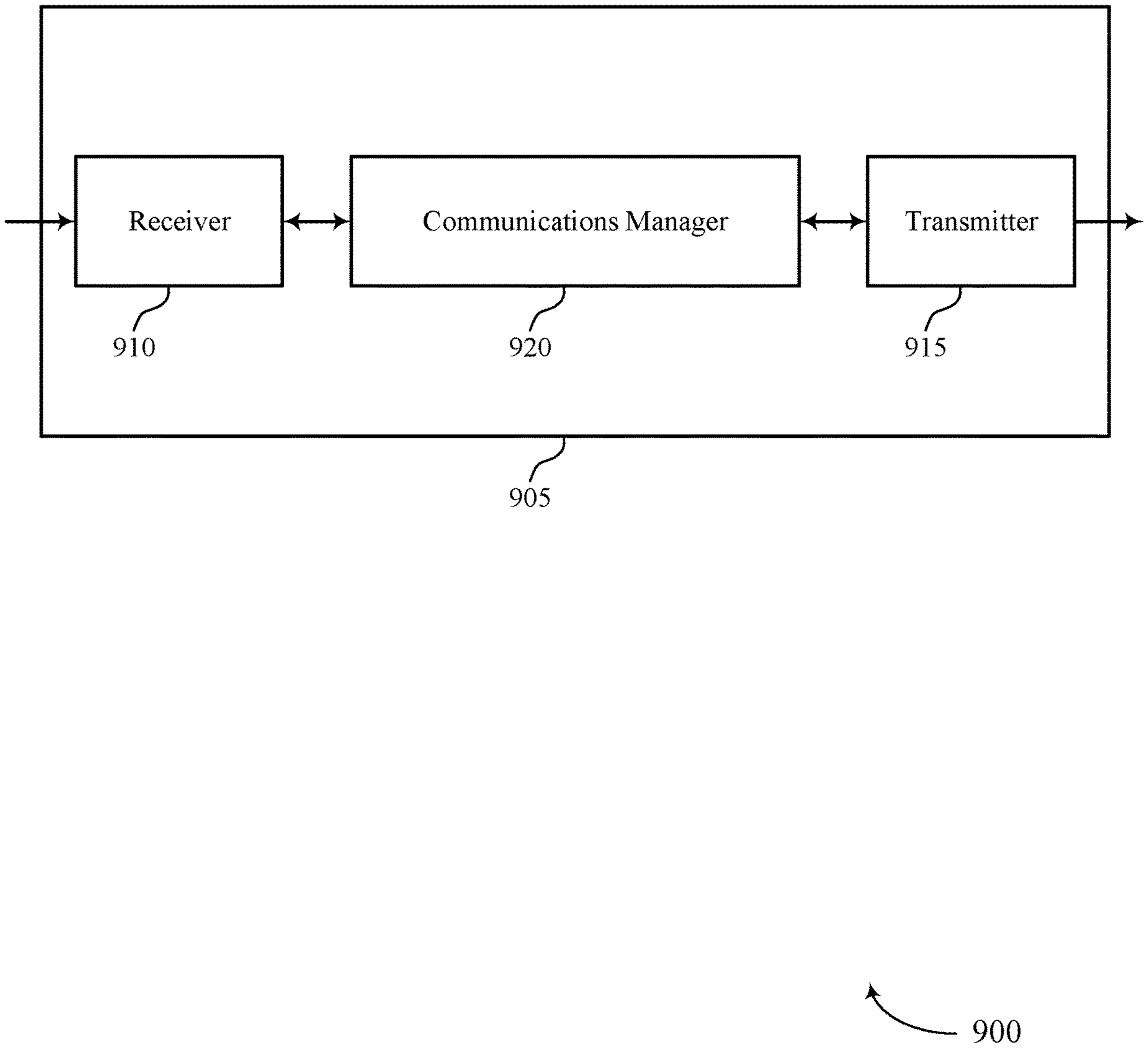
FIGS. 9 and 10 show block diagrams of devices that support FD considerations for CG TOs in accordance with one or more aspects of the present disclosure.

FIG. 9 shows a block diagram 900 of a device 905 that supports FD considerations for CG TOs in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of FD considerations for CG TOs as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for outputting a control message indicating a set of multiple resources allocated for one or more uplink shared channel messages, the set of multiple resources corresponding to a set of multiple UTOs within a time period of a CG configuration, where the set of multiple resources include one or more FD resources. The communications manager 920 is capable of, configured to, or operable to support a means for obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources by supporting exclusion of invalid UTOs in UTO-UCI and HARQ-ID determination for SBFD and other FD communications as well as supporting additional conflict handling rules in SBFD.

Figure 10:
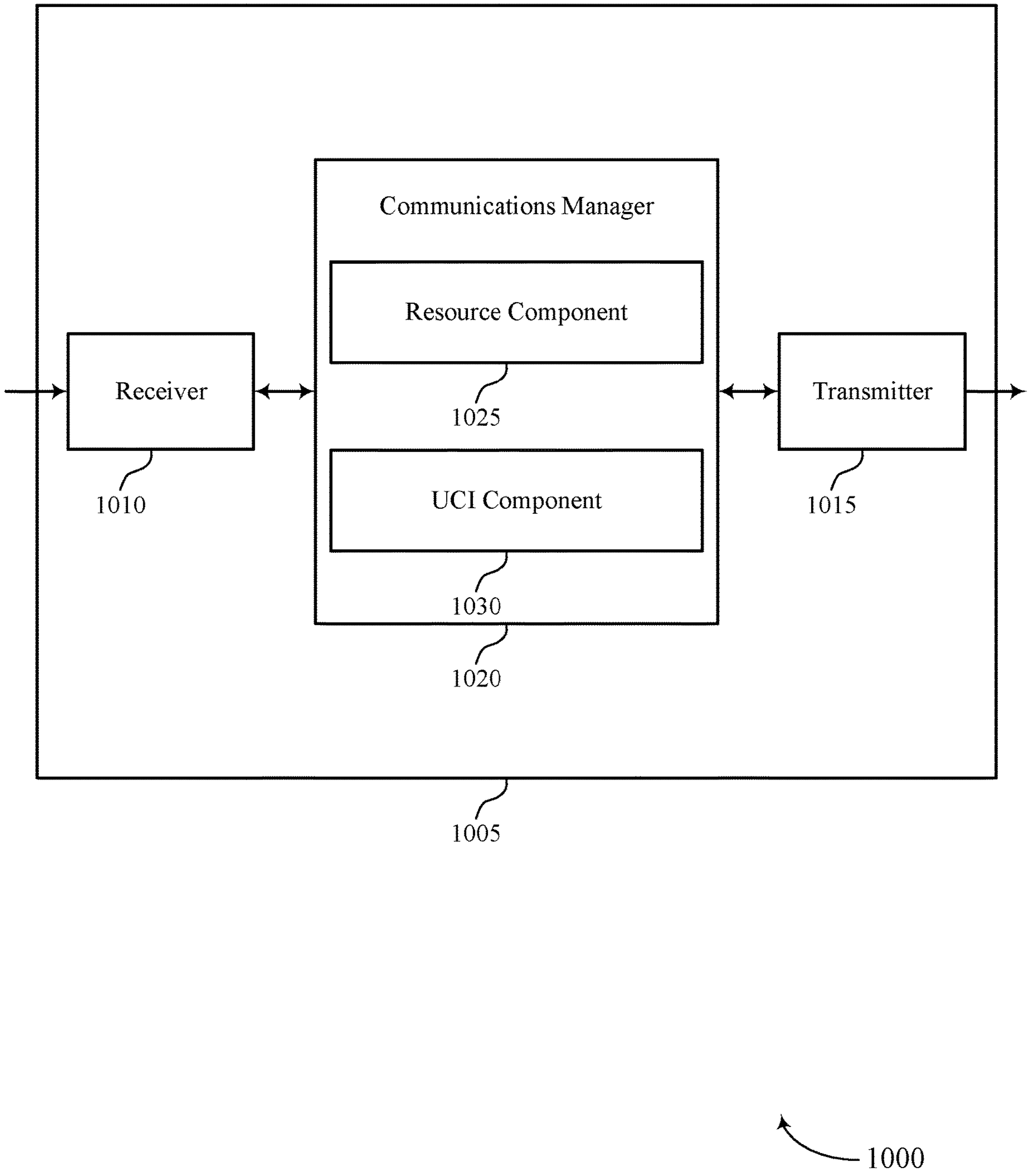

FIG. 10 shows a block diagram 1000 of a device 1005 that supports FD considerations for CG TOs in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of FD considerations for CG TOs as described herein. For example, the communications manager 1020 may include a resource component 1025 a UCI component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The resource component 1025 is capable of, configured to, or operable to support a means for outputting a control message indicating a set of multiple resources allocated for one or more uplink shared channel messages, the set of multiple resources corresponding to a set of multiple UTOs within a time period of a CG configuration, where the set of multiple resources include one or more FD resources. The UCI component 1030 is capable of, configured to, or operable to support a means for obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

Figure 11:
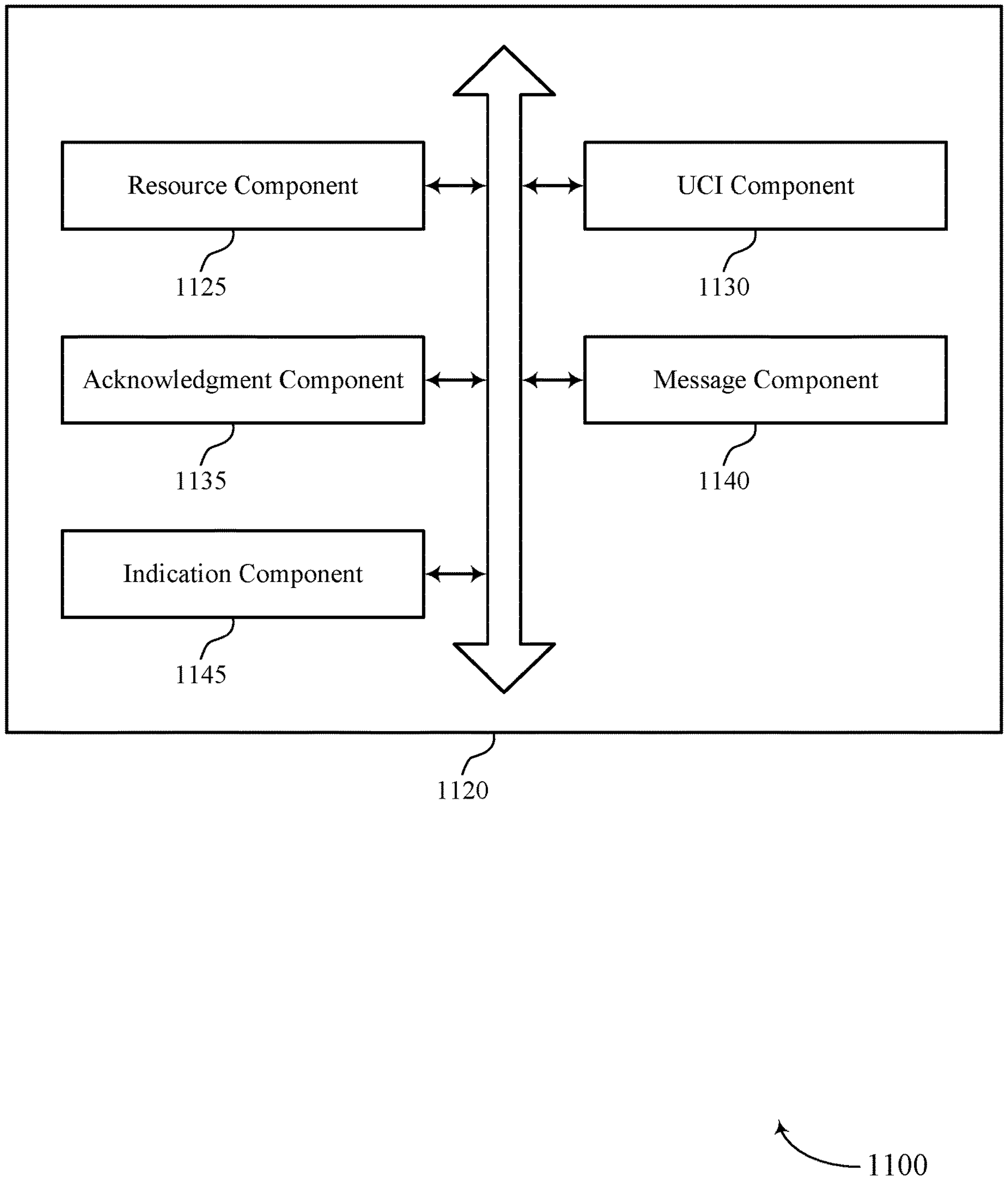
FIG. 11 shows a block diagram of a communications manager that supports FD considerations for CG TOs in accordance with one or more aspects of the present disclosure.

FIG. 11 shows a block diagram 1100 of a communications manager 1120 that supports FD considerations for CG TOs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of FD considerations for CG TOs as described herein. For example, the communications manager 1120 may include a resource component 1125, a UCI component 1130, an acknowledgment component 1135, a message component 1140, an indication component 1145, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The resource component 1125 is capable of, configured to, or operable to support a means for outputting a control message indicating a set of multiple resources allocated for one or more uplink shared channel messages, the set of multiple resources corresponding to a set of multiple UTOs within a time period of a CG configuration, where the set of multiple resources include one or more FD resources. The UCI component 1130 is capable of, configured to, or operable to support a means for obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

In some examples, the acknowledgment component 1135 is capable of, configured to, or operable to support a means for obtaining one or more acknowledgment or negative acknowledgment messages in accordance with an identifier, the identifier based on a first uplink shared channel occasion corresponding to a first UTO of the set of multiple UTOs, where the identifier is further based on the quantity of unused UTOs excluded from the indication.

In some examples, the message component 1140 is capable of, configured to, or operable to support a means for obtaining one or more second uplink shared channel messages during one or more valid UTOs of the set of multiple UTOs in accordance with the CG configuration. In some examples, the message component 1140 is capable of, configured to, or operable to support a means for outputting the one or more downlink messages during the one or more invalid UTOs.

In some examples, the UCI message is multiplexed with each of the one or more second uplink shared channel messages that are obtained during the one or more valid UTOs.

In some examples, the indication component 1145 is capable of, configured to, or operable to support a means for outputting a semi-static indication of a priority for each of the one or more downlink messages and for each of the one or more uplink shared channel messages, where the one or more invalid UTOs are excluded based on an uplink shared channel message of the one or more uplink shared channel messages having a first priority and a downlink message of the one or more downlink messages having a second priority higher than the first priority.

In some examples, the indication component 1145 is capable of, configured to, or operable to support a means for outputting a dynamic indication of a priority for each of the one or more downlink messages and for each of the one or more uplink shared channel messages, where the one or more invalid UTOs are excluded based on a duration satisfying a threshold duration associated with the dynamic indication and the UCI message.

In some examples, the one or more invalid UTOs are excluded based on a collision between an uplink shared channel message of the one or more uplink shared channel messages and one or more downlink control channel monitoring occasions associated with the one or more FD resources.

In some examples, the one or more invalid UTOs are excluded based on a collision between an uplink shared channel message of the one or more uplink shared channel messages and one or more SSSs associated with the one or more FD resources.

In some examples, the one or more invalid UTOs are excluded based on a collision between an uplink shared channel message of the one or more uplink shared channel messages and one or more TRSs associated with the one or more FD resources.

In some examples, the one or more invalid UTOs are excluded based on a first periodicity associated with the one or more uplink shared channel messages and a second periodicity associated with the one or more downlink messages.

In some examples, the UCI message includes a bitmap including one or more first bits indicating a first subset of the set of multiple UTOs including the quantity of unused UTOs and one or more second bits indicating a second subset of the set of multiple UTOs including a quantity of used UTOs.

Figure 12:
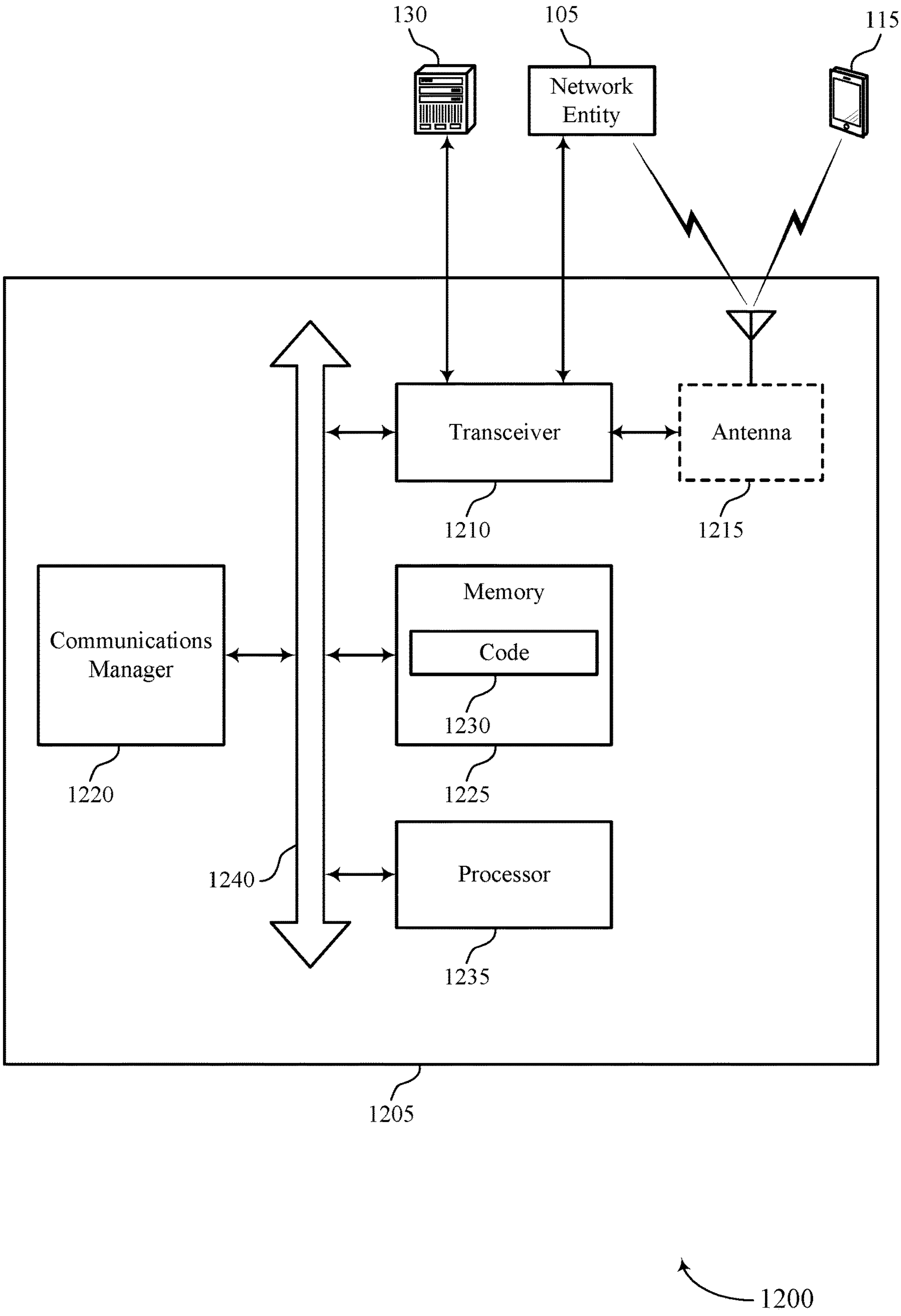
FIG. 12 shows a diagram of a system including a device that supports FD considerations for CG TOs in accordance with one or more aspects of the present disclosure.

FIG. 12 shows a diagram of a system 1200 including a device 1205 that supports FD considerations for CG TOs in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting FD considerations for CG TOs). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for outputting a control message indicating a set of multiple resources allocated for one or more uplink shared channel messages, the set of multiple resources corresponding to a set of multiple UTOs within a time period of a CG configuration, where the set of multiple resources include one or more FD resources. The communications manager 1220 is capable of, configured to, or operable to support a means for obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources.

By including or configuring the communications manager 1220 in accordance with examples as described herein, the device 1205 may support techniques for reduced latency, reduced power consumption and longer battery life, more efficient utilization of communication resources, improved utilization of processing capability, and improved user experience related to reduced processing by supporting exclusion of invalid UTOs in UTO-UCI and in HARQ ID determination for FD including SBFD communications, as well as supporting additional conflict handling rules in SBFD.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of FD considerations for CG TOs as described herein, or the at least one processor 1235 and the at least one memory 1225 may be otherwise configured to, individually or collectively, perform or support such operations.

Figure 13:
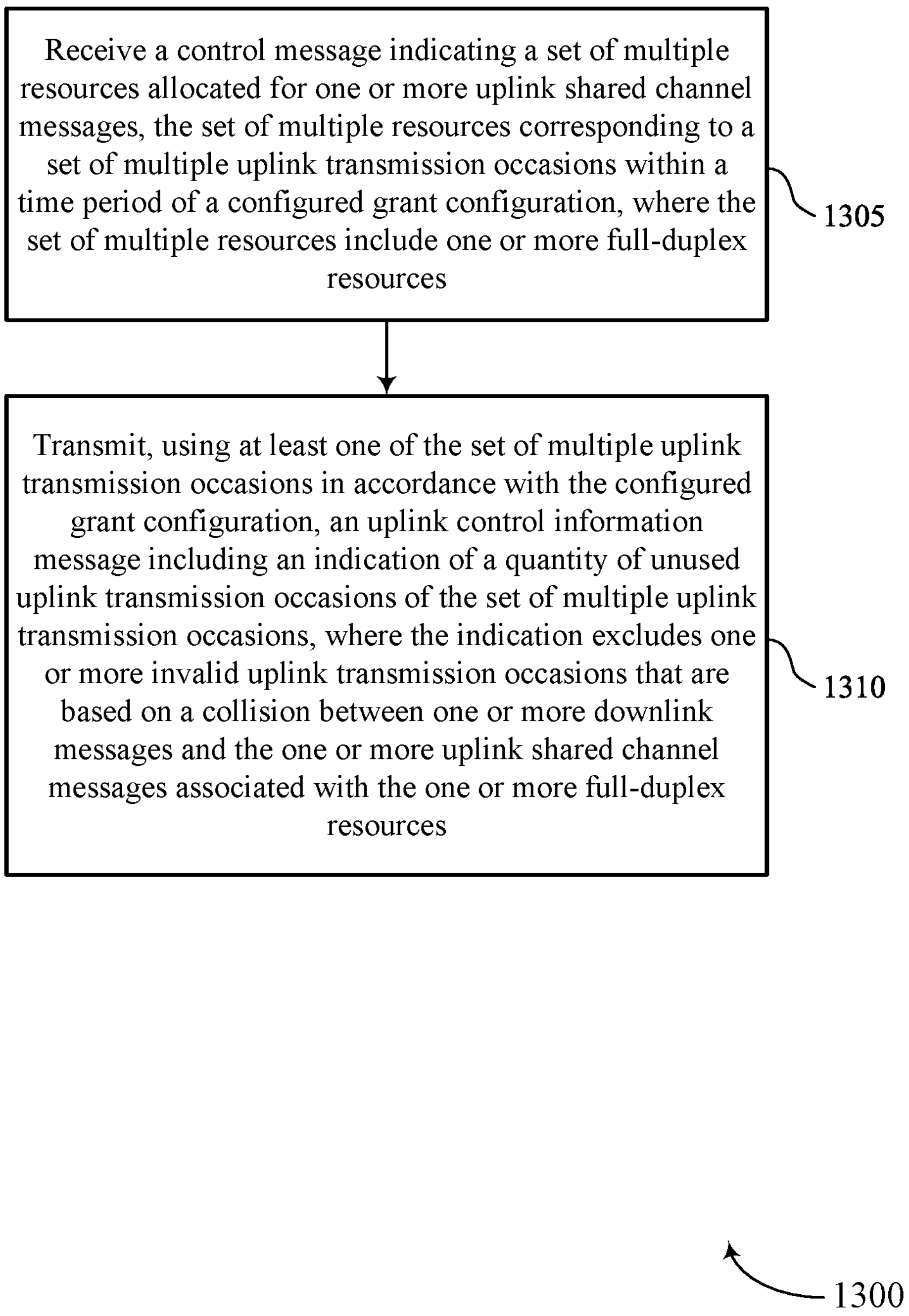
FIGS. 13 through 15 show flowcharts illustrating methods that support FD considerations for CG TOs in accordance with one or more aspects of the present disclosure.

FIG. 13 shows a flowchart illustrating a method 1300 that supports FD considerations for CG TOs in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receive a control message indicating a set of multiple resources allocated for one or more uplink shared channel messages, the set of multiple resources corresponding to a set of multiple UTOs within a time period of a CG configuration, where the set of multiple resources include one or more FD resources. The operations of 1305 may be performed in accordance with examples as disclosed herein. In some examples, aspects of the operations of 1305 may be performed by a resource component 725 as described with reference to FIG. 7.

At 1310, the method may include transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources. The operations of 1310 may be performed in accordance with examples as disclosed herein. In some examples, aspects of the operations of 1310 may be performed by a UCI component 730 as described with reference to FIG. 7.

Figure 14:
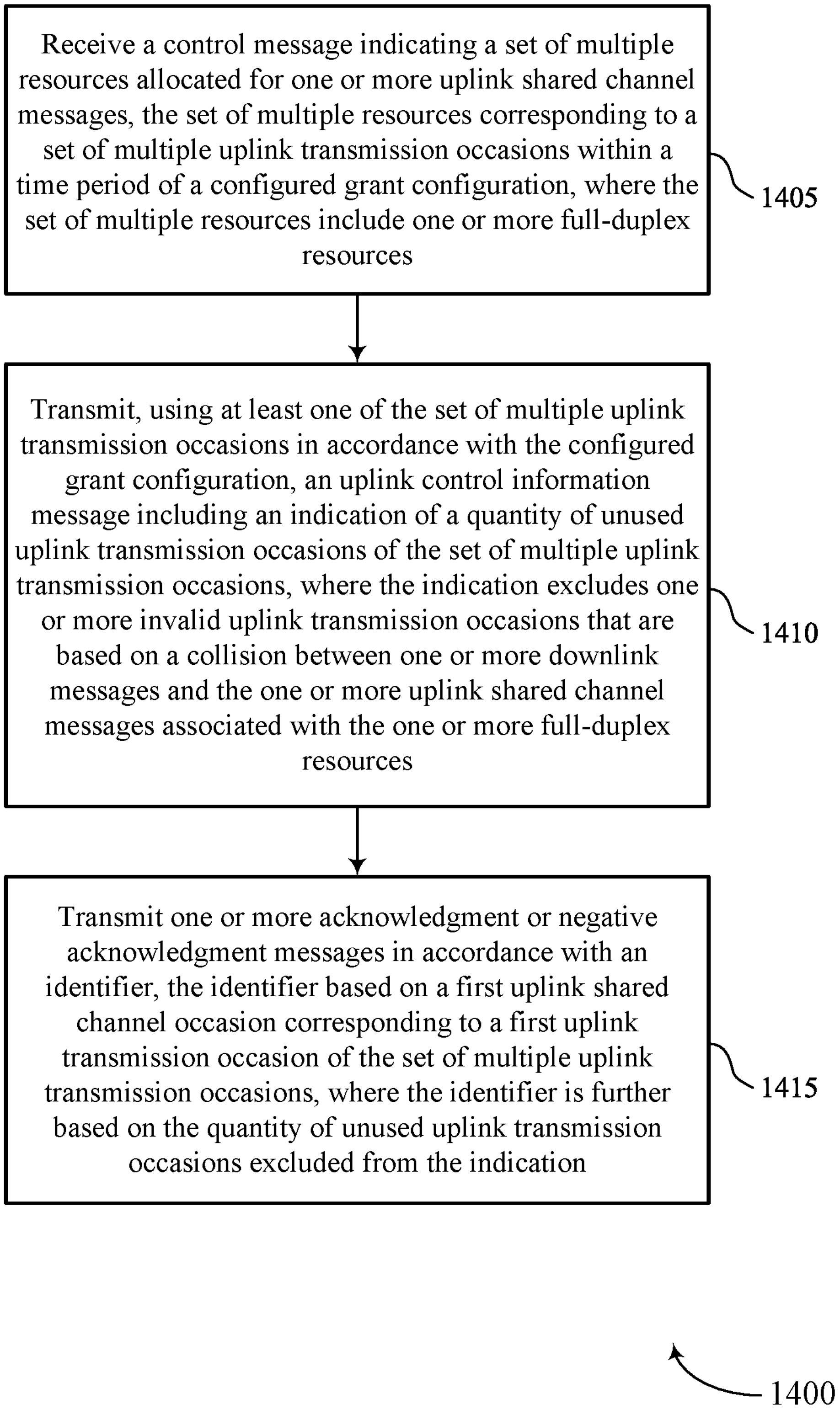

FIG. 14 shows a flowchart illustrating a method 1400 that supports FD considerations for CG TOs in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receive a control message indicating a set of multiple resources allocated for one or more uplink shared channel messages, the set of multiple resources corresponding to a set of multiple UTOs within a time period of a CG configuration, where the set of multiple resources include one or more FD resources. The operations of 1405 may be performed in accordance with examples as disclosed herein. In some examples, aspects of the operations of 1405 may be performed by a resource component 725 as described with reference to FIG. 7.

At 1410, the method may include transmitting, using at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources. The operations of 1410 may be performed in accordance with examples as disclosed herein. In some examples, aspects of the operations of 1410 may be performed by a UCI component 730 as described with reference to FIG. 7.

At 1415, the method may include transmitting one or more acknowledgment or negative acknowledgment messages in accordance with an identifier, the identifier based on a first uplink shared channel occasion corresponding to a first UTO of the set of multiple UTOs, where the identifier is further based on the quantity of unused UTOs excluded from the indication. The operations of 1415 may be performed in accordance with examples as disclosed herein. In some examples, aspects of the operations of 1415 may be performed by an acknowledgment component 735 as described with reference to FIG. 7.

Figure 15:
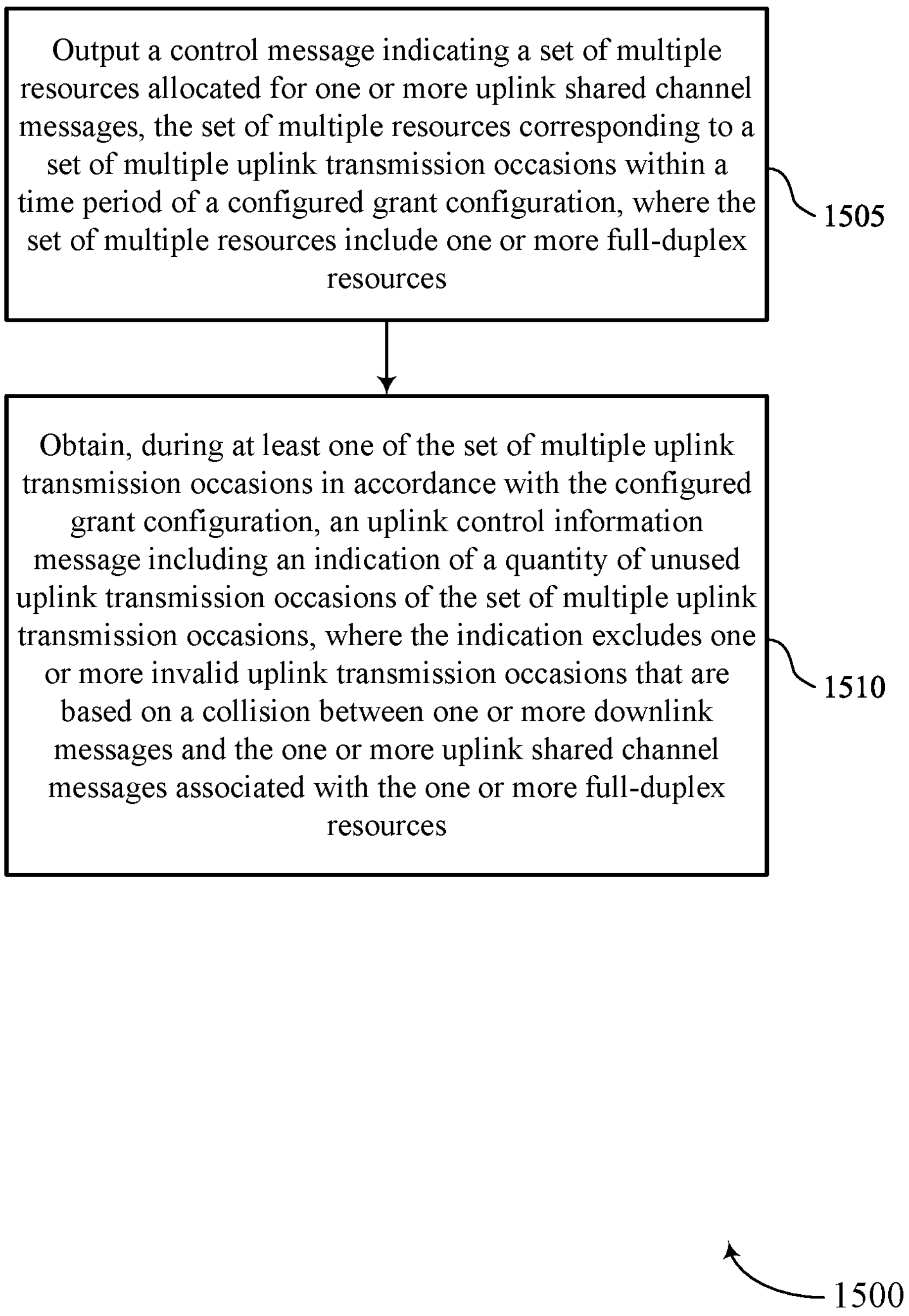

FIG. 15 shows a flowchart illustrating a method 1500 that supports FD considerations for CG TOs in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include outputting a control message indicating a set of multiple resources allocated for one or more uplink shared channel messages, the set of multiple resources corresponding to a set of multiple UTOs within a time period of a CG configuration, where the set of multiple resources include one or more FD resources. The operations of 1505 may be performed in accordance with examples as disclosed herein. In some examples, aspects of the operations of 1505 may be performed by a resource component 1125 as described with reference to FIG. 11.

At 1510, the method may include obtaining, during at least one of the set of multiple UTOs in accordance with the CG configuration, a UCI message including an indication of a quantity of unused UTOs of the set of multiple UTOs, where the indication excludes one or more invalid UTOs that are based on a collision between one or more downlink messages and the one or more uplink shared channel messages associated with the one or more FD resources. The operations of 1510 may be performed in accordance with examples as disclosed herein. In some examples, aspects of the operations of 1510 may be performed by a UCI component 1130 as described with reference to FIG. 11.

The following provides an overview of aspects of the present disclosure:

Aspect 1: A method for wireless communication by a UE, comprising: receive a control message indicating a plurality of resources allocated for one or more uplink shared channel messages, the plurality of resources corresponding to a plurality of UTOs within a time period of a CG configuration, wherein the plurality of resources include one or more FD resources; and transmitting, using at least one of the plurality of UTOs in accordance with the CG configuration, a UCI message comprising an indication of a quantity of unused UTOs of the plurality of UTOs, wherein the indication excludes one or more invalid UTOs that are based at least in part on a collision between one or more downlink messages and the one or more uplink shared channel messages associated with the one or more FD resources.

Aspect 2: The method of aspect 1, further comprising: transmitting one or more acknowledgment or negative acknowledgment messages in accordance with an identifier, the identifier based at least in part on a first uplink shared channel occasion corresponding to a first UTO of the plurality of UTOs, wherein the identifier is further based at least in part on the quantity of unused UTOs excluded from the indication.

Aspect 3: The method of any of aspects 1 through 2, further comprising: transmitting one or more second uplink shared channel messages during one or more valid UTOs of the plurality of UTOs in accordance with the CG configuration; and receiving the one or more downlink messages during the one or more invalid UTOs.

Aspect 4: The method of aspect 3, wherein the UCI message is multiplexed with each of the one or more second uplink shared channel messages that are transmitted during the one or more valid UTOs.

Aspect 5: The method of any of aspects 1 through 4, further comprising: receiving a semi-static indication of a priority for each of the one or more downlink messages and for each of the one or more uplink shared channel messages, wherein the one or more invalid UTOs are excluded based at least in part on an uplink shared channel message of the one or more uplink shared channel messages having a first priority and a downlink message of the one or more downlink messages having a second priority higher than the first priority.

Aspect 6: The method of any of aspects 1 through 5, further comprising: receiving a dynamic indication of a priority for each of the one or more downlink messages and for each of the one or more uplink shared channel messages, wherein the one or more invalid UTOs are excluded based at least in part on a duration satisfying a threshold duration, the duration being between an end of receiving the dynamic indication and a start time for transmitting the UCI message.

Aspect 7: The method of any of aspects 1 through 6, wherein the one or more invalid UTOs are excluded based at least in part on a collision between an uplink shared channel message of the one or more uplink shared channel messages and one or more downlink control channel monitoring occasions associated with the one or more FD resources.

Aspect 8: The method of any of aspects 1 through 7, wherein the one or more invalid UTOs are excluded based at least in part on a collision between an uplink shared channel message of the one or more uplink shared channel messages and one or more SSSs associated with the one or more FD resources.

Aspect 9: The method of any of aspects 1 through 8, wherein the one or more invalid UTOs are excluded based at least in part on a collision between an uplink shared channel message of the one or more uplink shared channel messages and one or more TRSs associated with the one or more FD resources.

Aspect 10: The method of any of aspects 1 through 9, wherein the one or more invalid UTOs are excluded based at least in part on a first periodicity associated with the one or more uplink shared channel messages and a second periodicity associated with the one or more downlink messages.

Aspect 11: The method of any of aspects 1 through 10, wherein the UCI message comprises a bitmap comprising one or more first bits indicating a first subset of the plurality of UTOs comprising the quantity of unused UTOs and one or more second bits indicating a second subset of the plurality of UTOs comprising a quantity of used UTOs.

Aspect 12: A method for wireless communication by a network entity, comprising: outputting a control message indicating a plurality of resources allocated for one or more uplink shared channel messages, the plurality of resources corresponding to a plurality of UTOs within a time period of a CG configuration, wherein the plurality of resources include one or more FD resources; and obtaining, during at least one of the plurality of UTOs in accordance with the CG configuration, a UCI message comprising an indication of a quantity of unused UTOs of the plurality of UTOs, wherein the indication excludes one or more invalid UTOs that are based at least in part on a collision between one or more downlink messages and the one or more uplink shared channel messages associated with the one or more FD resources.

Aspect 13: The method of aspect 12, further comprising: obtaining one or more acknowledgment or negative acknowledgment messages in accordance with an identifier, the identifier based at least in part on a first uplink shared channel occasion corresponding to a first UTO of the plurality of UTOs, wherein the identifier is further based at least in part on the quantity of unused UTOs excluded from the indication.

Aspect 14: The method of any of aspects 12 through 13, further comprising: obtaining one or more second uplink shared channel messages during one or more valid UTOs of the plurality of UTOs in accordance with the CG configuration; and outputting the one or more downlink messages during the one or more invalid UTOs.

Aspect 15: The method of aspect 14, wherein the UCI message is multiplexed with each of the one or more second uplink shared channel messages that are obtained during the one or more valid UTOs.

Aspect 16: The method of any of aspects 12 through 15, further comprising: outputting a semi-static indication of a priority for each of the one or more downlink messages and for each of the one or more uplink shared channel messages, wherein the one or more invalid UTOs are excluded based at least in part on an uplink shared channel message of the one or more uplink shared channel messages having a first priority and a downlink message of the one or more downlink messages having a second priority higher than the first priority.

Aspect 17: The method of any of aspects 12 through 16, further comprising: outputting a dynamic indication of a priority for each of the one or more downlink messages and for each of the one or more uplink shared channel messages, wherein the one or more invalid UTOs are excluded based at least in part on a duration satisfying a threshold duration associated with a downlink message of the one or more downlink messages and the UCI message.

Aspect 18: The method of any of aspects 12 through 17, wherein the one or more invalid UTOs are excluded based at least in part on a collision between an uplink shared channel message of the one or more uplink shared channel messages and one or more downlink control channel monitoring occasions associated with the one or more FD resources.

Aspect 19: The method of any of aspects 12 through 18, wherein the one or more invalid UTOs are excluded based at least in part on a collision between an uplink shared channel message of the one or more uplink shared channel messages and one or more SSSs associated with the one or more FD resources.

Aspect 20: The method of any of aspects 12 through 19, wherein the one or more invalid UTOs are excluded based at least in part on a collision between an uplink shared channel message of the one or more uplink shared channel messages and one or more TRSs associated with the one or more FD resources.

Aspect 21: The method of any of aspects 12 through 20, wherein the one or more invalid UTOs are excluded based at least in part on a first periodicity associated with the one or more uplink shared channel messages and a second periodicity associated with the one or more downlink messages.

Aspect 22: The method of any of aspects 12 through 21, wherein the UCI message comprises a bitmap comprising one or more first bits indicating a first subset of the plurality of UTOs comprising the quantity of unused UTOs and one or more second bits indicating a second subset of the plurality of UTOs comprising a quantity of used UTOs.

Aspect 23: A UE for wireless communication (or an apparatus for wireless communications at a UE), comprising one or more memories storing processor-executable code (e.g., instructions), and one or more processors coupled with the one or more memories and individually or collectively operable to execute the code (e.g., instructions) to cause the UE to perform a method of any of aspects 1 through 11.

Aspect 24: A UE (or apparatus) for wireless communication, comprising at least one means for performing a method of any of aspects 1 through 11.

Aspect 25: A non-transitory computer-readable medium storing code for wireless communication, the code comprising instructions executable by one or more processors to perform a method of any of aspects 1 through 11.

Aspect 26: A network entity for wireless communication (or an apparatus for wireless communications at a network entity), comprising one or more memories storing processor-executable code (e.g., instructions), and one or more processors coupled with the one or more memories and individually or collectively operable to execute the code (e.g., instructions) to cause the network entity to perform a method of any of aspects 12 through 22.

Aspect 27: A network entity (or apparatus) for wireless communication, comprising at least one means for performing a method of any of aspects 12 through 22.

Aspect 28: A non-transitory computer-readable medium storing code for wireless communication, the code comprising instructions executable by one or more processors to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- one or more processors; and
- instructions stored in one or more memories and executable by the one or more processors, individually or collectively, to cause the apparatus to:
  - receive a control message indicating a plurality of resources allocated for one or more uplink shared channel messages, the plurality of resources corresponding to a plurality of uplink transmission occasions within a time period of a configured grant configuration, wherein the plurality of resources include one or more full-duplex resources;
  - transmit, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that are based at least in part on a collision between one or more downlink messages and the one or more uplink shared channel messages associated with the one or more full-duplex resources; and
  - receive a semi-static indication of a priority for each of the one or more downlink messages and for each of the one or more uplink shared channel messages, wherein the one or more invalid uplink transmission occasions are excluded based at least in part on an uplink shared channel message of the one or more uplink shared channel messages having a first priority and a downlink message of the one or more downlink messages having a second priority higher than the first priority.

2. The apparatus of claim 1, wherein the instructions are further executable by the one or more processors, individually or collectively, to cause the apparatus to:
- transmit one or more acknowledgment or negative acknowledgment messages in accordance with an identifier, the identifier based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

3. The apparatus of claim 1, wherein the instructions are further executable by the one or more processors, individually or collectively, to cause the apparatus to:
- transmit one or more second uplink shared channel messages during one or more valid uplink transmission occasions of the plurality of uplink transmission occasions in accordance with the configured grant configuration; and
- receive the one or more downlink messages during the one or more invalid uplink transmission occasions.

4. The apparatus of claim 3, wherein the uplink control information message is multiplexed with each of the one or more second uplink shared channel messages that are transmitted during the one or more valid uplink transmission occasions.

5. The apparatus of claim 1, wherein the instructions are further executable by the one or more processors, individually or collectively, to cause the apparatus to:
- receive a dynamic indication of a priority for each of the one or more downlink messages and for each of the one or more uplink shared channel messages, wherein the one or more invalid uplink transmission occasions are excluded based at least in part on a duration satisfying a threshold duration, the duration being between an end of receiving the dynamic indication and a start time for transmitting the uplink control information message.

6. The apparatus of claim 1, wherein the one or more invalid uplink transmission occasions are excluded based at least in part on a collision between an uplink shared channel message of the one or more uplink shared channel messages and one or more downlink control channel monitoring occasions associated with the one or more full-duplex resources.

7. The apparatus of claim 1, wherein the one or more invalid uplink transmission occasions are excluded based at least in part on a collision between an uplink shared channel message of the one or more uplink shared channel messages and one or more SSSs associated with the one or more full-duplex resources.

8. The apparatus of claim 1, wherein the one or more invalid uplink transmission occasions are excluded based at least in part on a collision between an uplink shared channel message of the one or more uplink shared channel messages and one or more tracking reference signals associated with the one or more full-duplex resources.

9. The apparatus of claim 1, wherein the one or more invalid uplink transmission occasions are excluded based at least in part on a first periodicity associated with the one or more uplink shared channel messages and a second periodicity associated with the one or more downlink messages.

10. The apparatus of claim 1, wherein the uplink control information message comprises a bitmap comprising one or more first bits indicating a first subset of the plurality of uplink transmission occasions comprising the quantity of unused uplink transmission occasions and one or more second bits indicating a second subset of the plurality of uplink transmission occasions comprising a quantity of used uplink transmission occasions.

11. An apparatus for wireless communication at a network entity, comprising:

one or more processors; and instructions stored in one or more memories and executable by the one or more processors, individually or collectively, to cause the apparatus to:

output a control message indicating a plurality of resources allocated for one or more uplink shared channel messages, the plurality of resources corresponding to a plurality of uplink transmission occasions within a time period of a configured grant configuration, wherein the plurality of resources include one or more full-duplex resources;

obtain, during at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that are based at least in part on a collision between one or more downlink messages and the one or more uplink shared channel messages associated with the one or more full-duplex resources; and output a semi-static indication of a priority for each of the one or more downlink messages and for each of the one or more uplink shared channel messages, wherein the one or more invalid uplink transmission occasions are excluded based at least in part on an uplink shared channel message of the one or more uplink shared channel messages having a first priority and a downlink message of the one or more downlink messages having a second priority higher than the first priority.

12. The apparatus of claim 11, wherein the instructions are further executable by the one or more processors, individually or collectively, to cause the apparatus to:

obtain one or more acknowledgment or negative acknowledgment messages in accordance with an identifier, the identifier based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

13. The apparatus of claim 11, wherein the instructions are further executable by the one or more processors, individually or collectively, to cause the apparatus to:

obtain one or more second uplink shared channel messages during one or more valid uplink transmission occasions of the plurality of uplink transmission occasions in accordance with the configured grant configuration; and output the one or more downlink messages during the one or more invalid uplink transmission occasions.

14. The apparatus of claim 13, wherein the uplink control information message is multiplexed with each of the one or more second uplink shared channel messages that are obtained during the one or more valid uplink transmission occasions.

15. The apparatus of claim 11, wherein the instructions are further executable by the one or more processors, individually or collectively, to cause the apparatus to:

output a dynamic indication of a priority for each of the one or more downlink messages and for each of the one or more uplink shared channel messages, wherein the one or more invalid uplink transmission occasions are excluded based at least in part on a duration satisfying a threshold duration associated with the dynamic indication and the uplink control information message.

16. The apparatus of claim 11, wherein the one or more invalid uplink transmission occasions are excluded based at least in part on a collision between an uplink shared channel message of the one or more uplink shared channel messages and one or more downlink control channel monitoring occasions associated with the one or more full-duplex resources.

17. The apparatus of claim 11, wherein the one or more invalid uplink transmission occasions are excluded based at least in part on a collision between an uplink shared channel message of the one or more uplink shared channel messages and one or more SSSs associated with the one or more full-duplex resources.

18. The apparatus of claim 11, wherein the one or more invalid uplink transmission occasions are excluded based at least in part on a collision between an uplink shared channel message of the one or more uplink shared channel messages and one or more tracking reference signals associated with the one or more full-duplex resources.

19. The apparatus of claim 11, wherein the one or more invalid uplink transmission occasions are excluded based at least in part on a first periodicity associated with the one or more uplink shared channel messages and a second periodicity associated with the one or more downlink messages.

20. The apparatus of claim 11, wherein the uplink control information message comprises a bitmap comprising one or more first bits indicating a first subset of the plurality of uplink transmission occasions comprising the quantity of unused uplink transmission occasions and one or more second bits indicating a second subset of the plurality of uplink transmission occasions comprising a quantity of used uplink transmission occasions.

21. A method for wireless communication by a user equipment (UE), comprising:

receive a control message indicating a plurality of resources allocated for one or more uplink shared channel messages, the plurality of resources corresponding to a plurality of uplink transmission occasions within a time period of a configured grant configuration, wherein the plurality of resources include one or more full-duplex resources;

transmitting, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that are based at least in part on a collision between one or more downlink messages and the one or more uplink shared channel messages associated with the one or more full-duplex resources; and receiving a semi-static indication of a priority for each of the one or more downlink messages and for each of the one or more uplink shared channel messages, wherein the one or more invalid uplink transmission occasions are excluded based at least in part on an uplink shared channel message of the one or more uplink shared channel messages having a first priority and a downlink message of the one or more downlink messages having a second priority higher than the first priority.

22. The method of claim 21, further comprising:

transmitting one or more acknowledgment or negative acknowledgment messages in accordance with an identifier, the identifier based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

23. The method of claim 21, further comprising:

transmitting one or more second uplink shared channel messages during one or more valid uplink transmission occasions of the plurality of uplink transmission occasions in accordance with the configured grant configuration; and receiving the one or more downlink messages during the one or more invalid uplink transmission occasions.

24. The method of claim 23, wherein the uplink control information message is multiplexed with each of the one or more second uplink shared channel messages that are transmitted during the one or more valid uplink transmission occasions.

25. A method for wireless communication by a network entity, comprising:

outputting a control message indicating a plurality of resources allocated for one or more uplink shared channel messages, the plurality of resources corresponding to a plurality of uplink transmission occasions within a time period of a configured grant configuration, wherein the plurality of resources include one or more full-duplex resources;

obtaining, during at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that are based at least in part on a collision between one or more downlink messages and the one or more uplink shared channel messages associated with the one or more full-duplex resources; and outputting a semi-static indication of a priority for each of the one or more downlink messages and for each of the one or more uplink shared channel messages, wherein the one or more invalid uplink transmission occasions are excluded based at least in part on an uplink shared channel message of the one or more uplink shared channel messages having a first priority and a downlink message of the one or more downlink messages having a second priority higher than the first priority.

26. The method of claim 25, further comprising:

obtaining one or more acknowledgment or negative acknowledgment messages in accordance with an identifier, the identifier based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

27. The method of claim 25, further comprising:

obtaining one or more second uplink shared channel messages during one or more valid uplink transmission occasions of the plurality of uplink transmission occasions in accordance with the configured grant configuration; and outputting the one or more downlink messages during the one or more invalid uplink transmission occasions.

28. The method of claim 27, wherein the uplink control information message is multiplexed with each of the one or more second uplink shared channel messages that are obtained during the one or more valid uplink transmission occasions.

* * * * *